(12) United States Patent
Fukunaga et al.

(10) Patent No.: US 12,199,264 B2
(45) Date of Patent: Jan. 14, 2025

(54) METHOD OF MANUFACTURING FORMED BODY FOR ELECTRODE

(71) Applicant: FUJIFILM CORPORATION, Tokyo (JP)

(72) Inventors: Akihito Fukunaga, Kanagawa (JP); Eijiro Iwase, Kanagawa (JP); Koji Tonohara, Kanagawa (JP); Yasuhiro Sekizawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 485 days.

(21) Appl. No.: 17/647,601

(22) Filed: Jan. 11, 2022

(65) Prior Publication Data

US 2022/0131128 A1    Apr. 28, 2022

Related U.S. Application Data

(63) Continuation of application No. PCT/JP2020/029537, filed on Jul. 31, 2020.

(30) Foreign Application Priority Data

Aug. 19, 2019 (JP) .................. 2019-149869

(51) Int. Cl.
   *H01M 4/04* (2006.01)
(52) U.S. Cl.
   CPC ................. *H01M 4/0435* (2013.01)
(58) Field of Classification Search
   CPC .................................................. H01M 4/0435
   See application file for complete search history.

(56) References Cited

U.S. PATENT DOCUMENTS

| 6,202,271 B1 | 3/2001 | Goda et al. |
| 2013/0047430 A1 | 2/2013 | Hiramatsu et al. |
| 2014/0072697 A1 | 3/2014 | Hiramatsu |
| 2014/0242459 A1* | 8/2014 | Sanada ................. H01M 4/139 118/313 |

(Continued)

FOREIGN PATENT DOCUMENTS

| CN | 1229282 A | 9/1999 |
| CN | 102956865 A | 3/2013 |

(Continued)

OTHER PUBLICATIONS

English language translation of the following: Office action dated Sep. 27, 2022, from the JPO in a Japanese patent application No. 2021-540704 corresponding to the instant patent application.

(Continued)

*Primary Examiner* — Amanda C. Walke
(74) *Attorney, Agent, or Firm* — SOLARIS Intellectual Property Group, PLLC

(57) ABSTRACT

The present disclosure provides a method of manufacturing a formed body for an electrode including: a step of preparing an electrode material containing an electrode active material; a step of forming at least two projecting portions containing the electrode material and placed side by side on a support in a width direction of the support by supplying the electrode material onto the support; and a step of leveling the projecting portions on the support.

16 Claims, 2 Drawing Sheets

(56) References Cited

U.S. PATENT DOCUMENTS

| | | | |
|---|---|---|---|
| 2016/0056493 | A1 | 2/2016 | Umeda et al. |
| 2017/0062798 | A1* | 3/2017 | Wang .................. B05B 5/1683 |
| 2017/0077519 | A1 | 3/2017 | Kubota et al. |
| 2023/0155102 | A1* | 5/2023 | Mimura ............... B05C 1/0873 |
| | | | 429/209 |

FOREIGN PATENT DOCUMENTS

| | | | | | |
|---|---|---|---|---|---|
| CN | 103682254 | A | | 3/2014 | |
| CN | 106063006 | A | | 10/2016 | |
| CN | 114365304 | A | * | 4/2022 | ........ H01M 10/0525 |
| JP | S49-99906 | A | | 9/1974 | |
| JP | 2000-277129 | A | | 10/2000 | |
| JP | 4876478 | B2 | | 2/2012 | |
| JP | 2012-199150 | A | | 10/2012 | |
| JP | 2014-186969 | A | | 10/2014 | |
| JP | 6211426 | B2 | | 10/2017 | |

OTHER PUBLICATIONS

English language translation of the following: Office action dated Mar. 14, 2023 from the JPO in a Japanese patent application No. 2021-540704 corresponding to the instant patent application.

International Search Report issued in International Application No. PCT/JP2020/029537 on Oct. 27, 2020.

Written Opinion of the ISA issued in International Application No. PCT/JP2020/029537 on Oct. 27, 2020.

English language translation of the following: Office action dated Jan. 31, 2024 from the SIPO in a Chinese patent application No. 202080051955.3 corresponding to the instant patent application. This office action translation is submitted now in order to supplement the understanding of the cited references which are being disclosed in the instant Information Disclosure Statement.

* cited by examiner

METHOD OF MANUFACTURING FORMED BODY FOR ELECTRODE

CROSS-REFERENCE TO RELATED APPLICATIONS

This application is a continuation application of International Application No. PCT/JP2020/029537, filed Jul. 31, 2020, the disclosure of which is incorporated herein by reference in its entirety. Further, this application claims priority from Japanese Patent Application No. 2019-149869, filed Aug. 19, 2019, the disclosure of which is incorporated herein by reference in its entirety.

BACKGROUND OF THE INVENTION

1. Field of the Invention

The present disclosure relates to a method of manufacturing a formed body for an electrode.

2. Description of the Related Art

An electrolytic solution is usually used as an electrolyte contained in a battery such as a lithium ion battery. In recent years, from the viewpoint of safety (for example, prevention of liquid leakage), the development of an all-solid state battery that replaces an electrolytic solution with a solid electrolyte has been considered.

As a method of manufacturing a sheet for an electrode having a uniform film thickness, for example, JP4876478B discloses a method of manufacturing a sheet for an electrochemical element electrode, including the steps of: preparing an electrode material consisting of composite particles by spraying and granulating a slurry containing an electrode active material, a conductive material, a dispersion-type binder, and a soluble resin; supplying, by a fixed quantity feeder, the electrode material to a pair of pressing rolls placed nearly horizontally or a belt; and forming the electrode material into a sheet-shaped formed body by the pressing rolls or the belt.

A method of manufacturing a rolled sheet as a sheet for an electrode from a powder containing an electrode active material has also been considered. In the manufacturing of a rolled sheet, it is required to manufacture a rolled sheet with little variation in density distribution. In order to control the weight of powder per unit area of a supply object so as to be constant in a width direction and a machine direction, for example, JP6211426B discloses a method of changing the supply of a powder from a supply port by changing at least one of frequency or amplitude of the traveling wave. In addition, JP6211426B discloses a method of manufacturing a lithium ion battery, including a sheet forming step of forming a rolled sheet by pressurizing a powder for a lithium ion battery and a substrate.

SUMMARY OF THE INVENTION

The method of controlling the supply of an electrode material has room for improvement in uniformity of a mass distribution of a sheet for an electrode. For example, a fixed quantity feeder is used in the method described in JP4876478B. However, the mass distribution of a sheet for an electrode to be formed by a pair of pressing rolls still tends to depend on the accuracy of the pair of pressing rolls. In particular, in the method using a pair of pressing rolls, the larger the width of a target sheet for an electrode, the more difficult it is to make the roll gap uniform. Therefore, it becomes difficult to improve the uniformity of the mass distribution of the sheet for an electrode in a width direction. Similarly, even in a case where the supply of a powder from a supply port is controlled by the traveling wave as in the method described in JP6211426B, it is difficult to say that the uniformity of the mass distribution of the sheet for an electrode in a width direction is sufficient.

The present disclosure is contrived in view of the above circumstances.

An object of an embodiment of the present disclosure is to provide a method of manufacturing a formed body for an electrode, in which a formed body for an electrode that is excellent in uniformity of a mass distribution can be manufactured.

The present disclosure includes the following aspects.

<1> A method of manufacturing a formed body for an electrode including: a step of preparing an electrode material containing an electrode active material; a step of forming at least two projecting portions containing the electrode material and placed side by side on a support in a width direction of the support by supplying the electrode material onto the support; and a step of leveling the projecting portions on the support.

<2> The method of manufacturing a formed body for an electrode according to <1>, in which a maximum height $H_{max}$ of two neighboring projecting portions in the width direction of the support and a height L at a point where a height is minimum between the two projecting portions defining the maximum height $H_{max}$ satisfy a relationship of $0 \leq L/H_{max} < 0.95$.

<3> The method of manufacturing a formed body for an electrode according to <1> or <2>, in which a maximum height $H_{max}$ of two neighboring projecting portions in the width direction of the support and a distance D between the two projecting portions defining the maximum height $H_{max}$ satisfy a relationship of $1 < H_{max}/(D \times 0.5)$.

<4> The method of manufacturing a formed body for an electrode according to any one of <1> to <3>, in which the number of the projecting portions is at least 3.

<5> The method of manufacturing a formed body for an electrode according to <4>, in which distances between two neighboring projecting portions in the width direction of the support are equal.

<6> The method of manufacturing a formed body for an electrode according to any one of <1> to <5>, in which a distance between two neighboring projecting portions in the width direction of the support is in a range of 10 mm to 40 mm.

<7> The method of manufacturing a formed body for an electrode according to any one of <1> to <6>, in which in the step of forming the projecting portions, the projecting portions are formed in a strip shape extending in a direction orthogonal to the width direction of the support in a plan view.

<8> The method of manufacturing a formed body for an electrode according to any one of <1> to <7>, in which in the step of forming the projecting portions, movement regulating members that are placed on both end sides of the support in the width direction and regulate movement of the electrode material in the width direction of the support are used.

<9> The method of manufacturing a formed body for an electrode according to any one of <1> to <8>, in which in the step of leveling the projecting portions, movement regulating members that are placed on both end sides of the support in the width direction and regulate movement of the electrode material in the width direction of the support are used.

<10> The method of manufacturing a formed body for an electrode according to any one of <1> to <9>, in which in the step of forming the projecting portions, the electrode material is supplied onto the support by jetting the electrode material from at least two outlets placed side by side in the width direction of the support.

<11> The method of manufacturing a formed body for an electrode according to <10>, in which the number of the outlets is at least 3.

<12> The method of manufacturing a formed body for an electrode according to <11>, in which intervals between the outlets in the width direction of the support are equal.

<13> The method of manufacturing a formed body for an electrode according to any one of <10> to <12>, in which an interval between the outlets in the width direction of the support is in a range of 10 mm to 40 mm.

<14> The method of manufacturing a formed body for an electrode according to any one of <10> to <13>, in which a coefficient of variation of an amount of the electrode material jetted from the outlet is 4 or less.

<15> The method of manufacturing a formed body for an electrode according to any one of <10> to <14>, in which the number of the outlets is at least 3, and an amount of the electrode material jetted from the outlets placed on both end sides of the support in the width direction is less than that of the electrode material jetted from the outlet placed at a position other than the both end sides of the support in the width direction.

<16> The method of manufacturing a formed body for an electrode according to any one of <10> to <15>, in which in jetting the electrode material from the outlet, a scattering preventing member that is placed between the outlet and the support and prevents scattering of the electrode material is used.

According to an embodiment of the present disclosure, it is possible to provide a method of manufacturing a formed body for an electrode, in which a formed body for an electrode that is excellent in uniformity of a mass distribution can be manufactured.

DESCRIPTION OF THE PREFERRED EMBODIMENTS

Figure 1:
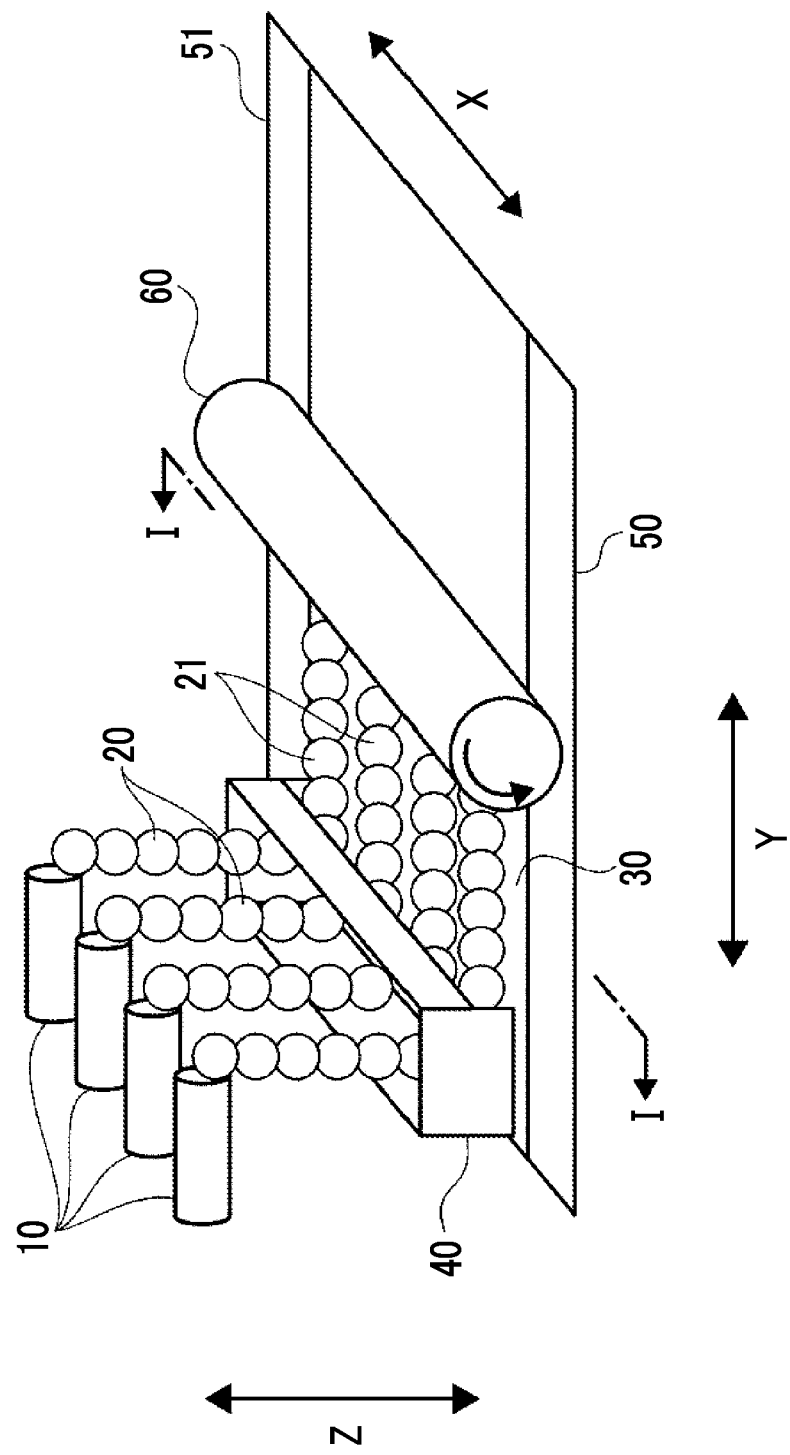
FIG. 1 is a schematic diagram showing an example of a method of manufacturing a formed body for an electrode according to the present disclosure.

Hereinafter, embodiments of the present disclosure will be described. The present disclosure is not limited to the following embodiments, and may be implemented with appropriate changes within the scope of the object of the present disclosure. In a case where the embodiments of the present disclosure are described with reference to the drawings, descriptions of overlapping constituent elements and references in the drawings may be omitted. The constituent elements denoted by using the same references in the drawings mean that these are the same constituent elements.

The dimensional ratios in the drawings do not necessarily represent the actual dimensional ratio.

In the present disclosure, a numerical range expressed using "to" means a range including numerical values before and after "to" as a lower limit and an upper limit. In numerical ranges described in a stepwise manner in the present disclosure, an upper limit or a lower limit described in a certain numerical range may be substituted with an upper limit or a lower limit of another numerical range described in a stepwise manner. Furthermore, in a numerical range described in the present disclosure, an upper limit or a lower limit described in a certain numerical range may be substituted with a value shown in an example.

In the present disclosure, the term "step" includes not only an independent step but also cases where it cannot be clearly distinguished from other steps, so long as the desired effect of the step can be achieved.

In the present disclosure, "(meth)acrylic" means acrylic and/or methacrylic.

In the present disclosure, regarding the amount of each component in a composition, in a case where there are a plurality of substances corresponding to the component in the composition, the amount means a total amount of the plurality of substances present in the composition, unless otherwise specified.

In the present disclosure, "mass %" and "wt %" are synonymous, and "parts by mass" and "parts by weight" are synonymous.

In the present disclosure, a combination of two or more preferable aspects is a more preferable aspect.

In the present disclosure, the "solid content" means a component which does not disappear by volatilization or evaporation in a case where a drying treatment is performed on 1 g of a sample at 200° C. for 6 hours under a nitrogen atmosphere.

In the present disclosure, the ordinal numbers (for example, "first" and "second") are terms that are used to distinguish the constituent elements, and do not limit the number of the constituent elements and the superiority or inferiority of the constituent elements.

<Method of Manufacturing Formed Body for Electrode>

A method of manufacturing a formed body for an electrode according to the present disclosure includes a step of preparing an electrode material containing an electrode active material (hereinafter, may be referred to as "preparation step"), a step of forming at least two projecting portions containing the electrode material and placed side by side on a support in a width direction of the support by supplying the electrode material onto the support (hereinafter, may be referred to as "projecting portion forming step"), and a step of leveling the projecting portions on the support (hereinafter, may be referred to as "leveling step"). Hereinafter, the term "projecting portion" means a single or a plurality of projecting portions unless otherwise specified.

In a case where the method of manufacturing a formed body for an electrode according to the present disclosure includes the above steps, a formed body for an electrode that is excellent in uniformity of a mass distribution can be manufactured. The reason why the method of manufacturing a formed body for an electrode according to the present disclosure produces the above effect is presumed as follows. For example, in the methods described in JP4876478B and JP6211426B, it is presumed that the electrode material is supplied so that the supply of the electrode material is uniform in the width direction and the length direction. The fluidity of the electrode material uniformly supplied in the width direction and the length direction is thought to be extremely low. Meanwhile, in the method of manufacturing a formed body for an electrode according to the present disclosure, by forming at least two projecting portions containing the electrode material and placed side by side in the width direction of the support, a recessed portion can be formed between the two neighboring projecting portions. That is, by forming at least two projecting portions placed side by side in the width direction of the support, an uneven structure can be formed along the width direction of the support. By forming the uneven structure along the width direction of the support, a space in which the electrode material is movable can be formed between the two neighboring projecting portions, and thus the fluidity of the electrode material forming the projecting portion can be increased particularly in the width direction of the support. Therefore, the electrode material forming the projecting portion can be easily spread in the width direction in the leveling of the projecting portion. Therefore, according to the method of manufacturing a formed body for an electrode according to the present disclosure, a formed body for an electrode that is excellent in uniformity of a mass distribution can be manufactured.

In the present disclosure, the "width direction of the support" means one optional direction (for example, lateral direction) along the in-plane direction of a surface of the support on which the electrode material is laminated in a plan view. In a case where the support is transported, the direction that is along the in-plane direction of the surface of the support on which the electrode material is laminated, and is orthogonal to the transport direction of the support in a plan view is referred to as "width direction of support".

In the present disclosure, "in a plan view" means that in a case where an object is placed on a plane, the object is viewed from a direction orthogonal to the plane.

In the present disclosure, the "length direction of the support" means a direction (for example, longitudinal direction) that is along the in-plane direction of the surface of the support on which the electrode material is laminated, and is orthogonal to the width direction of the support in a plan view.

In the present disclosure, the "thickness direction of the support" means a direction orthogonal to each of the width direction and the length direction of the support.

«Preparation Step»

The method of manufacturing a formed body for an electrode according to the present disclosure includes a step of preparing an electrode material containing an electrode active material (preparation step). In the present disclosure, "preparing an electrode material" means that the electrode material is made to be in a usable state, and includes preparing the electrode material unless otherwise specified. That is, in the preparation step, a pre-prepared electrode material or a commercially available electrode material may be prepared, or an electrode material may be prepared.

[Electrode Material]

The electrode material contains an electrode active material. The electrode material may optionally contain a component other than the electrode active material. Hereinafter, components of the electrode material will be described.

(Electrode Active Material)

The electrode active material is a substance capable of inserting and releasing ions of metal elements belonging to Group 1 or 2 in the periodic table. Examples of the electrode active material include positive electrode active materials and negative electrode active materials.

—Positive Electrode Active Material—

The positive electrode active material is not limited, and known active materials used for a positive electrode can be used. The positive electrode active material is preferably a positive electrode active material capable of reversibly inserting and releasing lithium ions.

Examples of the positive electrode active material include transition metal oxides and elements (for example, sulfur) that can be combined with lithium. Among the above examples, the positive electrode active material is preferably a transition metal oxide.

The transition metal oxide is preferably a transition metal oxide containing at least one transition metal element (hereinafter, referred to as "element Ma") selected from the group consisting of cobalt (Co), nickel (Ni), iron (Fe), manganese (Mn), copper (Cu), and vanadium (V).

In a case where the transition metal oxide contains Li and an element Ma, a molar ratio of Li to the element Ma (substance amount of Li/substance amount of element Ma) is preferably 0.3 to 2.2. In the present disclosure, the "substance amount of element Ma" refers to a total substance amount of all elements corresponding to the element Ma.

In addition, the transition metal oxide may contain at least one transition metal element (hereinafter, referred to as "element Mb") selected from the group consisting of Group 1 elements other than lithium, Group 2 elements, aluminum (Al), gallium (Ga), indium (In), germanium (Ge), tin (Sn), lead (Pb), antimony (Sb), bismuth (Bi), silicon (Si), phosphorus (P), and boron (B). The content of the element Mb (that is, a total content of all elements corresponding to the element Mb) is preferably 0 mol % to 30 mol % with respect to the substance amount of the element Ma.

Examples of the transition metal oxide include transition metal oxides having a bedded salt-type structure, transition metal oxides having a spinel-type structure, lithium-containing transition metal phosphate compounds, lithium-containing transition metal halogenated phosphate compounds, and lithium-containing transition metal silicate compounds.

Examples of the transition metal oxides having a bedded salt-type structure include $LiCoO_2$ (lithium cobalt oxide [LCO]), $LiNi_2O_2$ (lithium nickel oxide), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Examples of the transition metal oxides having a spinel-type structure include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds include olivine-type iron phosphate salts (for example, $LiFePO_4$ and $Li_3Fe_2(PO_4)_3$), iron pyrophosphate salts (for example, $LiFeP_2O_7$), cobalt phosphate salts (for example, $LiCoPO_4$), and monoclinic nasicon-type vanadium phosphate salts (for example, $Li_3V_2(PO_4)_3$ (lithium vanadium phosphate)).

Examples of the lithium-containing transition metal halogenated phosphate compounds include fluorinated iron phosphate salts (for example, $Li_2FePO_4F$), fluorinated manganese phosphate salts (for example, $Li_2MnPO_4F$), and fluorinated cobalt phosphate salts (for example, $Li_2CoPO_4F$).

Examples of the lithium-containing transition metal silicate compounds include $Li_2FeSiO_4$, $Li_2MnSiO_4$, and $Li_2CoSiO_4$.

The transition metal oxide is preferably a transition metal oxide having a bedded salt-type structure, and more preferably at least one compound selected from the group consisting of LiCoO$_2$ (lithium cobalt oxide [LCO]), LiNi$_{0.85}$Co$_{0.10}$Al$_{0.05}$O$_2$ (lithium nickel cobalt aluminum oxide [NCA]), and LiNi$_{1/3}$Co$_{1/3}$Mn$_{1/3}$O$_2$ (lithium nickel manganese cobalt oxide [NMC]).

The positive electrode active material may be a commercially available product or a synthetic product manufactured by a known method (for example, a firing method). For example, a positive electrode active material obtained by the firing method may be washed with water, an acidic aqueous solution, an alkaline aqueous solution, or an organic solvent.

The composition of the positive electrode active material is measured using inductive coupling plasma (ICP) emission spectrometric analysis.

The shape of the positive electrode active material is not limited, and is preferably a particulate shape from the viewpoint of handleability.

The volume average particle diameter of the positive electrode active material is not limited, and may be, for example, 0.1 μm to 50 μm. The volume average particle diameter of the positive electrode active material is preferably 0.3 μm to 40 μm, and more preferably 0.5 μm to 30 μm. In a case where the volume average particle diameter of the positive electrode active material is 0.3 μm or more, it is possible to easily form an aggregate of the electrode material, and it is possible to suppress the scattering of the electrode material during handling. In a case where the volume average particle diameter of the positive electrode active material is 40 μm or less, it is possible to easily adjust the thickness of a formed body for an electrode, and it is possible to suppress the generation of voids during the course of forming.

The volume average particle diameter of the positive electrode active material is measured by the following method. A dispersion liquid containing 0.1 mass % of the positive electrode active material is prepared by mixing the positive electrode active material with a solvent (for example, heptane, octane, toluene, or xylene). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the positive electrode active material. For other detailed conditions, refer to "JIS Z 8828: 2013" as necessary.

Examples of the method of adjusting the particle diameter of the positive electrode active material include a method using a pulverizer or a classifier.

The electrode material may contain one kind of positive electrode active material alone, or two or more kinds of positive electrode active materials.

The content of the positive electrode active material is preferably 10 mass % to 95 mass %, more preferably 30 mass % to 90 mass %, even more preferably 50 mass % to 85 mass %, and particularly preferably 60 mass % to 80 mass % with respect to the total solid content mass of the electrode material.

—Negative Electrode Active Material—

The negative electrode active material is not limited, and known active materials used for a negative electrode can be used. The negative electrode active material is preferably a negative electrode active material capable of reversibly inserting and releasing lithium ions.

Examples of the negative electrode active material include carbonaceous materials, metal oxides (for example, tin oxide), silicon oxides, metal composite oxides, lithium single bodies, lithium alloys (for example, lithium aluminum alloy), and metals (for example, Sn, Si, and In) that can form an alloy with lithium. Among the above examples, the negative electrode active material is preferably a carbonaceous material or a lithium composite oxide from the viewpoint of reliability.

The carbonaceous material is substantially a material consisting of carbon. Examples of the carbonaceous material include carbonaceous materials obtained by firing petroleum pitch, carbon black (for example, acetylene black), graphite (for example, natural graphite and artificial graphite (for example, vapor-grown graphite)), hard carbon, or synthetic resins (for example, polyacrylonitrile (PAN) and furfuryl alcohol resin). Examples of the carbonaceous material also include carbon fibers (for example, polyacrylonitrile-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and activated carbon fibers). Examples of the graphite include mesophase microspheres, graphite whisker, and flat graphite. In the present disclosure, "flat" means a shape having two principal planes facing in opposite directions.

The metal composite oxide is preferably a metal composite oxide capable of storing and releasing lithium. The metal composite oxide capable of storing and releasing lithium preferably contains at least one element selected from the group consisting of titanium and lithium from the viewpoint of high current density charging and discharging characteristics.

The metal oxide and the metal composite oxide are particularly preferably amorphous oxides. Here, "amorphous" means a substance having a broad scattering band having a peak at 20° to 40° in terms of 2θ in an X-ray diffraction method using CuKα rays. The amorphous oxide may have a crystalline diffraction line. In the amorphous oxide, the highest intensity of the crystalline diffraction lines observed at 40° to 70° in terms of 2θ is preferably 100 times or less, and more preferably 5 times or less the intensity of a diffraction line having a peak in a broad scattering band observed at 20° to 40° in terms of 2θ. The amorphous oxide particularly preferably has no crystalline diffraction line.

The metal oxide and the metal composite oxide are also preferably chalcogenides. A chalcogenide is a reaction product of a metal element and an element of Group 16 in the periodic table.

Among the compound group consisting of amorphous oxides and chalcogenides, amorphous oxides and chalcogenides of metalloid elements are preferable, and oxides and chalcogenides containing at least one element selected from the group consisting of elements of Groups 13 to 15 in the periodic table, Al, Ga, Si, Sn, Ge, Pb, Sb, and Bi are more preferable.

Preferable examples of the amorphous oxides and chalcogenides include Ga$_2$O$_3$, SiO, GeO, SnO, SnO$_2$, PbO, PbO$_2$, Pb$_2$O$_3$, Pb$_2$O$_4$, Pb$_3$O$_4$, Sb$_2$O$_3$, Sb$_2$O$_4$, Sb$_2$O$_8$Bi$_2$O$_3$, Sb$_2$O$_8$Si$_2$O$_3$, Bi$_2$O$_4$, SnSiO$_3$, GeS, SnS, SnS$_2$, PbS, PbS$_2$, Sb$_2$S$_3$, Sb$_2$S$_5$, and SnSiS$_3$. In addition, the above-described compound may be a composite oxide with lithium (for example, Li$_2$SnO$_2$).

The negative electrode active material preferably further contains titanium. The negative electrode active material containing titanium is preferably Li$_4$Ti$_5$O$_{12}$ (lithium titanate [LTO]) from the viewpoint that it has excellent high-speed charging and discharging characteristics since the volume thereof changes only to a small extent during the storing and release of lithium ions, and the life of the lithium ion secondary battery can be improved due to the suppression of deterioration of the electrode.

The negative electrode active material may be a commercially available product or a synthetic product manufactured by a known method (for example, a firing method). For example, a negative electrode active material obtained by the firing method may be washed using water, an acidic aqueous solution, an alkaline aqueous solution, or an organic solvent.

For example, CGB20 (Nippon Graphite Industries, Co., Ltd.) is available as the negative electrode active material.

The composition of the negative electrode active material is measured using inductive coupling plasma (ICP) emission spectrometric analysis.

The shape of the negative electrode active material is not limited, and is preferably a particulate shape from the viewpoint of easy handling and easy control of uniformity during mass production.

The volume average particle diameter of the negative electrode active material is preferably 0.1 µm to 60 µm, more preferably 0.3 µm to 50 µm, and particularly preferably 0.5 µm to 40 In a case where the volume average particle diameter of the negative electrode active material is 0.1 µm or more, it is possible to easily form an aggregate of the electrode material, and it is possible to suppress the scattering of the electrode material during handling. In a case where the volume average particle diameter of the negative electrode active material is 60 µm or less, it is possible to easily adjust the thickness of a formed body for an electrode, and it is possible to suppress the generation of voids during the course of forming. The volume average particle diameter of the negative electrode active material is measured by a method equivalent to the method of measuring the volume average particle diameter of the positive electrode active material.

Examples of the method of adjusting the particle diameter of the negative electrode active material include a method using a pulverizer or a classifier. In the above-described method, for example, a mortar, a ball mill, a sand mill, a vibrating ball mill, a satellite ball mill, a planetary ball mill, a swirling airflow-type jet mill, or a sieve is suitably used. In the pulverization of the negative electrode active material, wet pulverization using water or an organic solvent (for example, methanol) can also be optionally performed. The method of adjusting to a desired particle diameter is preferably classification. In the classification, for example, a sieve or a wind power classifier can be used. The classification may be performed in a dry manner or in a wet manner.

In a case where an amorphous oxide containing Sn, Si, or Ge is used as the negative electrode active material, preferable examples of the negative electrode active material that can be used in combination with the above-described amorphous oxide include carbon materials capable of storing and releasing lithium ions or a lithium metal, lithium, lithium alloys, and metals capable of being alloyed with lithium.

The electrode material may contain one kind of negative electrode active material alone, or two or more kinds of negative electrode active materials.

The content of the negative electrode active material is preferably 10 mass % to 80 mass %, more preferably 20 mass % to 80 mass %, even more preferably 30 mass % to 80 mass %, and particularly preferably 40 mass % to 75 mass % with respect to the total solid content mass of the electrode material.

The surfaces of the positive electrode active material and the negative electrode active material may be coated with a surface coating agent. Examples of the surface coating agent include metal oxides containing Ti, Nb, Ta, W, Zr, Si, or Li. Examples of the metal oxides include titanate spinels, tantalum-based oxides, niobium-based oxides, and lithium niobate-based compounds. Specific examples of the compounds include $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, and $LiBO_2$.

(Inorganic Solid Electrolyte)

The electrode material preferably contains an inorganic solid electrolyte from the viewpoint of an improvement in battery performance (for example, discharge capacity and output characteristics). Here, the "solid electrolyte" means a solid-state electrolyte in which ions can move inside thereof.

Since the inorganic solid electrolyte is not an electrolyte containing an organic substance as a principal ion-conductive material, it is clearly differentiated from organic solid electrolytes (for example, polymer electrolytes represented by polyethylene oxide (PEO), and organic electrolyte salts represented by lithium bis(trifluoromethanesulfonyl)imide (LiTFSI)). In addition, since the inorganic solid electrolyte is solid at steady state, it is not dissociated or liberated into cations or anions. Therefore, the inorganic solid electrolyte is also clearly differentiated from inorganic electrolyte salts (for example, $LiPF_6$, $LiBF_4$, lithium bis(fluoroulfonyl)imide (LiFSI), and LiCl) that are dissociated or liberated into cations or anions in electrolytic solutions or polymers.

The inorganic solid electrolyte is not limited as long as it is an inorganic solid electrolyte having ion conductivity of a metal element belonging to Group 1 or 2 in the periodic table, and generally does not have electron conductivity.

In a case where a formed body for an electrode obtained by the method of manufacturing a formed body for an electrode according to the present disclosure is used for a lithium ion battery, the inorganic solid electrolyte preferably has lithium ion conductivity.

Examples of the inorganic solid electrolyte include sulfide-based inorganic solid electrolytes and oxide-based inorganic solid electrolytes. Among the above examples, the inorganic solid electrolyte is preferably a sulfide-based inorganic solid electrolyte from the viewpoint that a good interface can be formed between the active material and the inorganic solid electrolyte.

—Sulfide-Based Inorganic Solid Electrolyte—

The sulfide-based inorganic solid electrolyte preferably contains a sulfur atom (S), has ion conductivity of a metal element belonging to Group 1 or 2 in the periodic table, and has an electron-insulating property.

The sulfide-based inorganic solid electrolyte more preferably contains at least Li, S, and P, and has lithium ion conductivity. The sulfide-based inorganic solid electrolyte may optionally contain an element other than Li, S, and P.

Examples of the sulfide-based inorganic solid electrolyte include an inorganic solid electrolyte having a composition represented by Formula (A).

$$L_{a1}M_{b1}P_{c1}S_{d1}A_{e1} \qquad \text{Formula (A)}$$

In Formula (A), L represents at least one element selected from the group consisting of Li, Na, and K, and is preferably Li.

In Formula (A), M represents at least one element selected from the group consisting of B, Zn, Sn, Si, Cu, Ga, Sb, Al, and Ge, and is preferably B, Sn, Si, Al, or Ge, and more preferably Sn, Al, or Ge.

In Formula (A), A represents at least one element selected from the group consisting of I, Br, Cl, and F, and is preferably I or Br, and more preferably I.

In Formula (A), a1 represents 1 to 12, and is preferably 1 to 9, and more preferably 1.5 to 4.

In Formula (A), b1 represents 0 to 1, and is more preferably 0 to 0.5.

In Formula (A), c1 represents 1.

In Formula (A), d1 represents 2 to 12, and is preferably 3 to 7, and more preferably 3.25 to 4.5.

In Formula (A), e1 represents 0 to 5, and is preferably 0 to 3, and more preferably 0 to 1.

In Formula (A), it is preferable that b1 and e1 are 0, it is more preferable that b1 and e1 are 0, and a proportion of a1, c1, and d1 (that is, a1:c1:d1) is 1 to 9:1:3 to 7, and it is particularly preferable that b1 and e1 are 0, and a proportion of a1, c1, and d1 (that is, a1:c1:d1) is 1.5 to 4:1:3.25 to 4.5.

The compositional ratio of each element can be controlled by, for example, adjusting an amount of the raw material compound to be blended in the manufacturing of the sulfide-based inorganic solid electrolyte.

The sulfide-based inorganic solid electrolyte may be amorphous (glass) or crystallized (glass ceramics), or only partially crystallized. Examples of the sulfide-based inorganic solid electrolyte described above include Li—P—S-based glass containing Li, P, and S, and Li—P—S-based glass ceramics containing Li, P, and S. Among the above examples, the sulfide-based inorganic solid electrolyte is preferably Li—P—S-based glass.

The lithium ion conductivity of the sulfide-based inorganic solid electrolyte is preferably $1 \times 10'$ S/cm or more, and more preferably $1 \times 10^{-3}$ S/cm or more. The upper limit of the lithium ion conductivity of the sulfide-based inorganic solid electrolyte is not limited. The lithium ion conductivity of the sulfide-based inorganic solid electrolyte is, for example, substantially $1 \times 10^{-1}$ S/cm or less.

The sulfide-based inorganic solid electrolyte can be manufactured by, for example, (1) a reaction of lithium sulfide ($Li_2S$) and phosphorus sulfide (for example, diphosphorus pentasulfide ($P_2S_5$)), (2) a reaction of lithium sulfide and at least one of a phosphorus single body or a sulfur single body, or (3) a reaction of lithium sulfide, phosphorus sulfide (for example, diphosphorus pentasulfide ($P_2S_5$)), and at least one of a phosphorus single body or a sulfur single body.

The molar ratio of $Li_2S$ to $P_2S_5$ ($Li_2S:P_2S_5$) in the manufacturing of the Li—P—S-based glass and the Li—P—S-based glass ceramics is preferably 65:35 to 85:15, and more preferably 68:32 to 77:23. By setting the molar ratio of $Li_2S$ to $P_{255}$ within the above range, lithium ion conductivity can be further increased.

Examples of the sulfide-based inorganic solid electrolyte include a compound formed of a raw material composition containing $Li_2S$ and a sulfide of an element of Groups 13 to 15. Examples of the raw material composition include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2a_5$, $Li_2S$—$SiS_2$—$P_2S_5$—LiI, $Li_2S$—$SiS_5$—LiI, $Li_2S$—$SiS_2$—$Li_4SiO_4$, $Li_2S$—$SiS_2$—$Li_3PO_4$, and $Li_{10}GeP_2S_{12}$. Among the above examples, the raw material composition is preferably $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$, and more preferably $Li_2S$—$P_2S_5$, $LiioGeP_2S_{12}$, or $Li_2S$—$P_2S_5$—$SiS_2$ from the viewpoint of high lithium ion conductivity.

Examples of the method of manufacturing the sulfide-based inorganic solid electrolyte using the above-described raw material composition include an amorphization method. Examples of the amorphization method include a mechanical milling method and a melting quenching method. Among the above examples, a mechanical milling method is preferable from the viewpoint that the treatment can be performed at normal temperature and the manufacturing process can be simplified.

—Oxide-Based Inorganic Solid Electrolyte—

The oxide-based inorganic solid electrolyte preferably contains an oxygen atom (O), has ion conductivity of a metal element belonging to Group 1 or Group 2 in the periodic table, and has an electron-insulating property.

The ion conductivity of the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit of the ion conductivity of the oxide-based inorganic solid electrolyte is not limited. The ion conductivity of the oxide-based inorganic solid electrolyte is, for example, substantially $1 \times 10^{-1}$ S/cm or less.

Examples of the oxide-based inorganic solid electrolyte include the following compounds. However, the oxide-based inorganic solid electrolyte is not limited to the following compounds.

(1) $Li_{xa}La_{ya}TiO_3$ (hereinafter, referred to as "LLT". xa satisfies $0.3 \leq xa \leq 0.7$ and ya satisfies $0.3 \leq ya \leq 0.7$)

(2) $Li_{xb}La_{yb}Zr_{zb}M^{bb}{}_{mb}O_{nb}$ ($M^{bb}$ is at least one element selected from the group consisting of Al, Mg, Ca, Sr, V, Nb, Ta, Ti, Ge, In, and Sn. xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$)

(3) $Li_{xc}B_{yc}M^{cc}{}_{zc}O_{nc}$ ($M^{cc}$ is at least one element selected from the group consisting of C, S, Al, Si, Ga, Ge, In, and Sn. xc satisfies $0 \leq xc \leq 5$, yc satisfies $0 \leq yc \leq 1$, zc satisfies $0 \leq zc \leq 1$, and nc satisfies $0 \leq nc \leq 6$)

(4) $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, and satisfies $1 \leq md \leq 7$, and nd satisfies $3 \leq nd \leq 13$)

(5) $Li_{(3-2xe)}M^{ee}{}_{xe}D^{ee}O$ (xe satisfies $0 \leq xe \leq 0.1$, $M^{ee}$ represents a divalent metal atom, and $D^{ee}$ represents a halogen atom or a combination of two or more halogen atoms)

(6) $Li_{xf}Si_{yf}O_{zf}$ (xf satisfies $1 \leq xf \leq 5$, yf satisfies $0 \leq yf \leq 3$, and zf satisfies $1 \leq zf \leq 10$)

(7) $Li_{xg}S_{yg}O_{zg}$ (xg satisfies $1 \leq xg \leq 3$, yg satisfies $0 \leq yg \leq 2$, and zg satisfies $1 \leq zg \leq 10$)

(8) $Li_3BO_3$ (9) $Li_3BO_3$—$Li_2SO_4$

(10) $Li_2O$—$B_2O_3$—$P_2O_5$

(11) $Li_2O$—$SiO_2$

(12) $Li_6BaLa_2Ta_2O_{12}$

(13) $Li_3PO_{(4-3/2w)}N_w$ (w satisfies w<1)

(14) $Li_{3.5}Zn_{0.25}GeO_4$ having a lithium super ionic conductor (LISICON)-type crystal structure

(15) $La_{0.55}Li_{0.35}TiO_3$ having a perovskite-type crystal structure
(16) $LiTi_2P_3O_{12}$ having a natrium super ionic conductor (NASICON)-type crystal structure
(17) $Li_{1+xh+yh}(Al, Ge)_{xh}(Ti, Ge)_{2-xh}Si_{yh}P_{3-yh}O_{12}$ (xh satisfies $0 \leq xh \leq 1$ and yh satisfies $0 < yh < 1$)
(18) $Li_7La_3Zr_2O_{12}$ having a garnet-type crystal structure (hereinafter, referred to as "LLZ")

As the oxide-based inorganic solid electrolyte, phosphorus compounds containing Li, P, and O are also preferable. Examples of the phosphorus compounds containing Li, P, and O include lithium phosphate ($Li_3PO_4$), LiPON in which a part of oxygen of lithium phosphate is substituted with nitrogen, and LiPOD1 (D1 is at least one element selected from the group consisting of Ti, V, Cr, Mn, Fe, Co, Ni, Cu, Zr, Nb, Mo, Ru, Ag, Ta, W, Pt, and Au).

As the oxide-based inorganic solid electrolyte, $LiA^1ON$ ($A^1$ is at least one element selected from the group consisting of Si, B, Ge, Al, C, and Ga) is also preferable.

Among the above examples, the oxide-based inorganic solid electrolyte is preferably LLT, $Li_{xb}La_{yb}Zr_{zb}M^{bb}_{mb}O_{nb}$ ($M^{bb}$, xb, yb, zb, mb, and nb are as described above), LLZ, $Li_3BO_3$, $Li_3BO_3$—$Li_2SO_4$, or $Li_{xd}(Al, Ga)_{yd}(Ti, Ge)_{zd}Si_{ad}P_{md}O_{nd}$ (xd, yd, zd, ad, md, and nd are as described above), more preferably LLT, LLZ, LAGP ($Li_{1.5}Al_{0.5}Ge_{1.5}(PO_4)_3$), or LATP ($[Li_{1.4}Ti_2Si_{0.4}P_{2.6}O_{12}]$—$AlPO_4$), and particularly preferably LLZ.

The inorganic solid electrolyte preferably has a particulate shape.

The volume average particle diameter of the inorganic solid electrolyte is preferably 0.01 μm or more, and more preferably 0.1 μm or more. The volume average particle diameter of the inorganic solid electrolyte is preferably 100 μm or less, and more preferably 50 μm or less.

The volume average particle diameter of the inorganic solid electrolyte is measured by the following method. A dispersion liquid containing 1 mass % of the inorganic solid electrolyte is prepared by mixing the inorganic solid electrolyte with water (heptane in a case where the volume average particle diameter of a substance unstable to water is measured). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the inorganic solid electrolyte. For other detailed conditions, refer to "JIS Z 8828: 2013" as necessary.

The electrode material may contain one kind of inorganic solid electrolyte alone, or two or more kinds of inorganic solid electrolytes.

In a case where the electrode material contains an inorganic solid electrolyte, the content of the inorganic solid electrolyte is preferably 1 mass % or more, more preferably 5 mass % or more, and particularly preferably 10 mass % or more with respect to the total solid content mass of the electrode material from the viewpoint of reduction of interface resistance and a battery characteristic maintaining effect (for example, improvement in cycle characteristics). From the same viewpoint, the content of the inorganic solid electrolyte is preferably 90 mass % or less, more preferably 70 mass % or less, and particularly preferably 50 mass % or less with respect to the total solid content mass of the electrode material.

(Binder)

The electrode material preferably contains a binder from the viewpoint of an improvement in adhesiveness between the electrode materials. The binder is not limited as long as it is an organic polymer, and known binders used as a binder in a positive electrode or a negative electrode of the battery material can be used. Examples of the binder include fluorine-containing resins, hydrocarbon-based thermoplastic resins, acrylic resins, and urethane resins.

Examples of the fluorine-containing resins include polytetrafluoroethylene (PTFE), polyvinylene difluoride (PVdF), and a copolymer of polyvinylene difluoride and hexafluoropropylene (PVdF-HFP).

Examples of the hydrocarbon-based thermoplastic resins include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of the acrylic resins include methyl poly(meth)acrylate, ethyl poly(meth)acrylate, isopropyl poly(meth)acrylate, isobutyl poly(meth)acrylate, butyl poly(meth)acrylate, hexyl poly(meth)acrylate, octyl poly(meth)acrylate, dodecyl poly(meth)acrylate, stearyl poly(meth)acrylate, 2-hydroxyethyl poly(meth)acrylate, poly(meth)acrylate, benzyl poly(meth)acrylate, glycidyl poly(meth)acrylate, dimethylaminopropyl poly(meth)acrylate, and copolymers of monomers forming the above resins.

Examples of the binder also include copolymers of vinyl-based monomers. Examples of the copolymers of vinyl-based monomers include a methyl (meth)acrylate-styrene copolymer, a methyl (meth)acrylate-acrylonitrile copolymer, and a butyl (meth)acrylate-acrylonitrile-styrene copolymer.

The weight-average molecular weight of the binder is preferably 10,000 or more, more preferably 20,000 or more, and particularly preferably 50,000 or more. The weight-average molecular weight of the binder is preferably 1,000,000 or less, more preferably 200,000 or less, and particularly preferably 100,000 or less.

The moisture concentration in the binder is preferably 100 ppm or less on a mass basis.

The metal concentration in the binder is preferably 100 ppm or less on a mass basis.

The electrode material may contain one kind of binder alone, or two or more kinds of binders.

In a case where the electrode material contains a binder, the content of the binder is preferably 0.01 mass % or more, more preferably 0.1 mass % or more, and particularly preferably 1 mass % or more with respect to the total solid content mass of the electrode material from the viewpoint of reduction of interface resistance and maintaining of the reduction. The content of the binder is preferably 10 mass % or less, more preferably 5 mass % or less, and particularly preferably 3 mass % or less with respect to the total solid content mass of the electrode material from the viewpoint of battery performance.

In a case where the electrode material contains an electrode active material, an inorganic solid electrolyte, and a binder, a ratio of the total mass of the active material and the inorganic solid electrolyte to the mass of the binder ([mass of active material+mass of inorganic solid electrolyte]/[mass of binder]) is preferably 1,000 to 1, more preferably 500 to 2, and particularly preferably 100 to 10.

(Conductive Auxiliary Agent)

The electrode material preferably contains a conductive auxiliary agent from the viewpoint of an improvement in electron conductivity of the active material. The conductive auxiliary agent is not limited, and known conductive auxiliary agents can be used. In particular, in a case where the electrode material contains a positive electrode active material, the electrode material preferably contains a conductive auxiliary agent.

Examples of the conductive auxiliary agent include graphite (for example, natural graphite and artificial graphite), carbon black (for example, acetylene black, Ketjen black, and furnace black), amorphous carbon (for example, needle coke), carbon fibers (for example, vapor-grown carbon fibers and carbon nanotubes), other carbonaceous materials (for example, graphene and fullerene), metal powders (for example, a copper powder and a nickel powder), metal fibers (for example, copper fibers and nickel fibers), and conductive polymers (for example, polyaniline, polypyrrole, polythiophene, polyacetylene, and polyphenylene derivatives).

Among the above examples, the conductive auxiliary agent is preferably at least one conductive auxiliary agent selected from the group consisting of carbon fibers and metal fibers.

Examples of the shape of the conductive auxiliary agent include a fibrous shape, an acicular shape, a tubular shape, a dumbbell shape, a disk shape, and an oval spherical shape. Among the above examples, the shape of the conductive auxiliary agent is preferably a fibrous shape from the viewpoint of an improvement in electron conductivity of the active material.

The aspect ratio of the conductive auxiliary agent is preferably 1.5 or more, and more preferably 5 or more. In a case where the aspect ratio of the conductive auxiliary agent is 1.5 or more, the electron conductivity of the electrode active material can be improved, and thus the output characteristics of the battery can be improved.

The aspect ratio of the conductive auxiliary agent is preferably 10,000 or less, more preferably 5,000 or less, and particularly preferably 1,000 or less. Furthermore, the aspect ratio of the conductive auxiliary agent is preferably 500 or less, more preferably 300 or less, and particularly preferably 100 or less. In a case where the aspect ratio of the conductive auxiliary agent is 10,000 or less, the dispersibility of the conductive auxiliary agent can be improved, and a short circuit due to the conductive auxiliary agent penetrating a formed body for an electrode can be efficiently prevented.

The aspect ratio of the conductive auxiliary agent is measured by the following method. SEM images of three optional visual fields taken at 1,000 to 3,000-fold observation magnification using a scanning electron microscope (SEM) (for example, XL30 manufactured by Koninklijke Philips N.V) are converted to bitmap (BMP) files. Images of 50 particles of the conductive auxiliary agent are imported using image analysis software (for example, "A-ZOKUN" that is an integrated application of IP-1000PC manufactured by Asahi Engineering Co., Ltd.). A maximum length and a minimum length of each of the particles of the conductive auxiliary agent are read in a state in which the particles of the conductive auxiliary agent are observed without being overlapped. The "maximum length of the conductive auxiliary agent" means the length (that is, major axis length) of a line segment having the maximum length among line segments from a certain point to another point on the outer circumference of the conductive auxiliary agent particle. The "minimum length of the conductive auxiliary agent" means the length (that is, minor axis length) of a line segment having the minimum length among line segments from a certain point to another point on the outer circumference of the conductive auxiliary agent particle, which are orthogonal to the line segment having the maximum value. An average (A) of 40 points excluding upper 5 points and lower 5 points among the maximum lengths (major axis lengths) of the 50 particles of the conductive auxiliary agent is obtained. Next, an average (B) of 40 points excluding upper 5 points and lower 5 points among the minimum lengths (minor axis lengths) of the 50 particles of the conductive auxiliary agent is obtained. The aspect ratio of the conductive auxiliary agent is calculated by dividing the average (A) by the average (B).

The minor axis length of the conductive auxiliary agent is preferably 10 μm or less, more preferably 8 μm or less, and particularly preferably 5 μm or less.

The minor axis length of the conductive auxiliary agent is preferably 1 nm or more, more preferably 3 nm or more, and particularly preferably 5 nm or more.

The minor axis length of the conductive auxiliary agent is the minimum length of each of 50 particles of the conductive auxiliary agent calculated in the method of measuring the aspect ratio of the conductive auxiliary agent.

The average minor axis length of the conductive auxiliary agent is preferably 8 μm or less, more preferably 5 μm or less, and particularly preferably 3 μm or less.

The average minor axis length of the conductive auxiliary agent is preferably 1 nm or more, more preferably 2 nm or more, and particularly preferably 3 nm or more.

The average minor axis length of the conductive auxiliary agent is an average of the minor axis lengths of the particles of the conductive auxiliary agent, excluding upper 10% (that is, upper 5 points) and lower 10% (that is, lower 5 points) of the minimum lengths (minor axis lengths) of 50 particles of the conductive auxiliary agent calculated in the method of measuring the aspect ratio of the conductive auxiliary agent.

The electrode material may contain one kind of conductive auxiliary agent alone, or two or more kinds of conductive auxiliary agents.

In a case where the electrode material contains a conductive auxiliary agent, the content of the conductive auxiliary agent is preferably more than 0 mass % and 10 mass % or less, more preferably 0.5 mass % to 8 mass %, and particularly preferably 1 mass % to 7 mass % with respect to the total solid content mass of the electrode material from the viewpoint of an improvement in electron conductivity of the active material.

(Lithium Salt)

The electrode material preferably contains a lithium salt from the viewpoint of an improvement in battery performance. The lithium salt is not limited, and known lithium salts can be used.

As the lithium salt, the lithium salts described in paragraphs 0082 to 0085 of JP2015-088486A are preferable.

The electrode material may contain one kind of lithium salt alone, or two or more kinds of lithium salts.

In a case where the electrode material contains a lithium salt, the content of the lithium salt is preferably 0.1 mass % to 10 mass % with respect to the total solid content mass of the electrode material.

(Dispersant)

The electrode material preferably contains a dispersant. In a case where the electrode material contains a dispersant, it is possible to suppress the aggregation in a case where the concentration of any one of the electrode active material or the inorganic solid electrolyte is high.

The dispersant is not limited, and known dispersants can be used. The dispersant is preferably a compound formed of low molecules of a molecular weight of 200 or more and less than 3,000 or oligomers, and having a functional group represented by the following functional group group (I) and an alkyl group having 8 or more carbon atoms or an aryl group having 10 or more carbon atoms in the same molecule.

The functional group group (I) is at least one functional group selected from the group consisting of an acidic group, a group having a basic nitrogen atom, a (meth)acryloyl group, a (meth)acrylamide group, an alkoxysilyl group, an epoxy group, an oxetanyl group, an isocyanate group, a cyano group, and a sulfanyl group, and a hydroxy group, preferably at least one functional group selected from the group consisting of an acidic group, a group having a basic nitrogen atom, an alkoxysilyl group, a cyano group, a sulfanyl group, and a hydroxy group, and more preferably at least one functional group selected from the group consisting of a carboxy group, a sulfonic acid group, a cyano group, an amino group, and a hydroxy group.

The electrode material may contain one kind of dispersant alone, or two or more kinds of dispersants.

In a case where the electrode material contains a dispersant, the content of the dispersant is preferably 0.2 mass % to 10 mass %, and more preferably 0.5 mass % to 5 mass % with respect to the total solid content mass of the electrode material from the viewpoint that both the prevention of aggregation and the battery performance are achieved.

(Liquid Component)

The electrode material may contain a liquid component. Examples of the liquid component include an electrolytic solution.

The electrolytic solution is not limited, and known electrolytic solutions can be used. Examples of the electrolytic solution include an electrolytic solution containing an electrolyte and a solvent. Specific examples of the electrolytic solution include an electrolytic solution containing a lithium salt compound as an electrolyte and a carbonate compound as a solvent.

Examples of the lithium salt compound include lithium hexafluorophosphate. The electrolytic solution may contain one kind of lithium salt compound alone, or two or more kinds of lithium salt compounds.

Examples of the carbonate compound include ethyl methyl carbonate, ethylene carbonate, and propylene carbonate. The electrolytic solution may contain one kind of carbonate compound alone, or two or more kinds of carbonate compounds.

Examples of the electrolyte contained in the electrolytic solution include the materials described in the above section "Inorganic Solid Electrolyte".

As a component of the electrolytic solution, for example, an ionic liquid may be used. The ionic liquid may be used as an electrolyte or a solvent.

The content of the electrolytic solution in the electrode material is preferably 30 mass % or less, more preferably 20 mass % or less, and particularly preferably 15 mass % or less with respect to the total mass of the electrode material. In a case where the content of the electrolytic solution in the electrode material is 30 mass % or less, it is possible to suppress the oozing of the electrolytic solution during the forming of the electrode material.

The content of the electrolytic solution in the electrode material is preferably 0.01 mass % or more, and more preferably 0.1 mass % or more with respect to the total mass of the electrode material from the viewpoint of an improvement in battery performance.

The electrode material may contain, as a liquid component, a solvent other than the solvent contained as a component of the electrolytic solution (hereinafter, also simply referred to as "solvent"). Examples of the solvent include alcohol compound solvents, ether compound solvents, amide compound solvents, amino compound solvents, ketone compound solvents, aromatic compound solvents, aliphatic compound solvents, and nitrile compound solvents.

Examples of the alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound solvents include alkylene glycol alkyl ether (for example, ethylene glycol monomethyl ether, ethylene glycol monobutyl ether, diethylene glycol, dipropylene glycol, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and diethylene glycol monobutyl ether), dimethyl ether, diethyl ether, diisopropyl ether, dibutyl ether, tetrahydrofuran, and dioxane.

Examples of the amide compound solvents include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric triamide.

Examples of the amino compound solvents include triethylamine, diisopropylethylamine, and tributylamine.

Examples of the ketone compound solvents include acetone, methyl ethyl ketone, methyl isobutyl ketone, and cyclohexanone.

Examples of the aromatic compound solvents include benzene, toluene, and xylene.

Examples of the aliphatic compound solvents include hexane, heptane, octane, and decane.

Examples of the nitrile compound solvents include acetonitrile, propionitrile, and isobutyronitrile.

The solvent is preferably at least one solvent selected from the group consisting of a nitrile compound solvent, an aromatic compound solvent, and an aliphatic compound solvent, more preferably at least one solvent selected from the group consisting of isobutyronitrile, toluene, and heptane, and particularly preferably at least one solvent selected from the group consisting of toluene and heptane.

The boiling point of the solvent is preferably 50° C. or higher, and more preferably 70° C. or higher at normal pressure (that is, 1 atm). The boiling point of the solvent is preferably 250° C. or lower, and more preferably 220° C. or lower at normal pressure (that is, 1 atm).

The electrode material may contain one kind of solvent alone, or two or more kinds of solvents.

The content of the solvent (including the solvent contained as a component of the electrolytic solution, and this is the same in this paragraph) in the electrode material is preferably 30 mass % or less, more preferably 20 mass % or less, and particularly preferably 15 mass % or less with respect to the total mass of the electrode material. In a case where the content of the solvent in the electrode material is 30 mass % or less, it is possible to suppress the deterioration of battery performance, and it is possible to suppress the oozing of the solvent during the forming of the electrode material. The lower limit of the content of the solvent in the electrode material is not limited. The content of the solvent in the electrode material may be determined in a range of 0 mass % or more. The content of the solvent in the electrode material may be 0 mass %, or may exceed 0 mass %.

The content of the liquid component in the electrode material is preferably 30 mass % or less, more preferably 20 mass % or less, and particularly preferably 15 mass % or less with respect to the total mass of the electrode material. In a case where the content of the liquid component in the electrode material is 30 mass % or less, it is possible to suppress the oozing of the liquid component during the forming of the electrode material. In addition, in a case where the liquid component contains a solvent, it is possible to suppress the deterioration of battery performance. The lower limit of the content of the liquid component in the electrode material is not limited. The content of the liquid component in the electrode material may be determined in a range of 0 mass % or more. The content of the liquid component in the electrode material may be 0 mass %, or may exceed 0 mass %.

As the electrode material, for example, the following materials can also be used in addition to the above materials.
(1) The granulated body described in paragraphs 0029 to 0037 of JP2017-104784A
(2) The positive electrode mixture paint described in paragraph 0054 of JP2016-059870A
(3) The composite particles described in paragraphs 0017 to 0070 of JP2016-027573A
(4) The composite particles described in paragraphs 0020 to 0033 of JP6402200B
(5) The electrode composition described in paragraphs 0040 to 0065 of JP2019-046765A
(6) The materials (for example, active material, positive electrode slurry, and negative electrode slurry) described in paragraphs 0080 to 0114 of JP2017-054703A
(7) The powder described in JP2014-198293A
(8) The active material, binder, and composite particles described in paragraphs 0024 to 0025, 0028, and 0030 to 0032 of JP2016-062654A (Shape)

The shape of the electrode material is not limited. The electrode material is preferably a particulate electrode material (that is, powder) from the viewpoint of battery performance.

(Electrode Material Preparation Method)

The electrode material can be prepared by, for example, mixing the electrode active material with the above-described optional components other than the electrode active material. Examples of the mixing method include a method using a ball mill, a beads mill, a planetary mixer, a blade mixer, a roll mill, a kneader, or a disk mill.

«Projecting Portion Forming Step»

The method of manufacturing a formed body for an electrode according to the present disclosure includes a step of forming at least two projecting portions containing the electrode material and placed side by side on the support in the width direction of the support by supplying the electrode material onto the support (projecting portion forming step). In a case where the method of manufacturing a formed body for an electrode according to the present disclosure includes the projecting portion forming step, the fluidity of the electrode material forming the projecting portion can be increased, and thus a formed body for an electrode that is excellent in uniformity of a mass distribution can be manufactured.

In the present disclosure, the "projecting portion" means a portion that projects in an opposite direction to the support (that is, a direction away from the support) in a cross-sectional view along the surface of the support from the direction orthogonal to the width direction of the support (that is, the length direction of the support). For the cross-sectional view, a height distribution measured using a laser displacement gauge along the width direction of the support may be used. According to the height distribution, the cross-sectional shape can be confirmed by a line showing the surface shape of the measurement surface (hereinafter, referred to as "contour line"). The height distribution is measured by irradiating the surface of the support and the surface of the electrode material on the support with laser at intervals of 0.1 mm along the width direction of the support by using a laser displacement gauge (for example, LK-G5000 manufactured by KEYENCE CORPORATION).

In the present disclosure, the "at least two projecting portions placed side by side in the width direction of the support" means that at least two projecting portions are placed next to each other in the width direction of the support in a cross-sectional view along the surface of the support from the direction orthogonal to the width direction of the support (that is, length direction of the support). For the cross-sectional view, a height distribution measured using a laser displacement gauge along the width direction of the support may be used. The height distribution is measured by the method described above.

[Support]

The support is not limited, and known supports can be used. Examples of the material of the support include metals and resins.

Examples of the metals include aluminum and stainless steel. As the support containing a metal, metal foil is preferable.

Examples of the resins include polyethylene terephthalate, polyethylene, polypropylene, and polyethylene naphthalate. As the support containing a resin, a resin film is preferable.

The support may be paper. Examples of the paper include release paper.

The support may be a collector. In a case where the support is a collector, the electrode material can be easily placed on the collector, and moreover, productivity can also be improved. The collector is not limited, and known collectors can be used.

Examples of the positive electrode collector include aluminum, aluminum alloys, stainless steel, nickel, and titanium. The positive electrode collector is preferably aluminum or an aluminum alloy. The positive electrode collector is also preferably aluminum or stainless steel having a surface with a coating layer containing carbon, nickel, titanium, or silver.

Examples of the negative electrode collector include aluminum, copper, copper alloys, stainless steel, nickel, and titanium. The negative electrode collector is preferably aluminum, copper, a copper alloy, or stainless steel, and more preferably copper or a copper alloy. The negative electrode collector is also preferably aluminum, copper, a copper alloy, or stainless steel having a surface with a coating layer containing carbon, nickel, titanium, or silver.

As the collector, aluminum foil or copper foil is preferable. Aluminum foil is usually used as a collector at the positive electrode. Copper foil is usually used as a collector at the negative electrode.

The support may be surface-treated. Examples of the surface treatment include silicone coating and fluorine coating.

The shape of the support is not limited. The shape of the support is preferably a flat plate shape.

The thickness of the support is not limited. The average thickness of the support is preferably 5 µm or more, more preferably 10 µm or more, and particularly preferably 20 µm or more from the viewpoint of probability of large area. The average thickness of the support is preferably 500 µm or less, more preferably 300 µm or less, and particularly preferably 200 µm or less from the viewpoint of flexibility and lightweight property. The average thickness of the support is an arithmetic average of the thicknesses measured at three points by cross-section observation. In the cross-section observation, known microscopes (for example, a scanning electron microscope) can be used.

[Electrode Material Supplying Method]

In the projecting portion forming step, the electrode material is supplied onto the support. The method of supplying the electrode material onto the support is not limited, and known methods can be used. Examples of the method of supplying the electrode material onto the support include a method using a supply device.

Examples of the supply device include a screw feeder, a disk feeder, a rotary feeder, and a belt feeder. The supply device is preferably a disk feeder from the viewpoint of accuracy of the supply. For example, the accuracy of the supply can be improved by increasing the opening area of an outlet of the disk feeder.

A portion of the supply device that is brought into contact with the electrode material may be surface-treated. Examples of the surface treatment include silicone coating and fluorine coating. The surface treatment may be a corona treatment.

Examples of the method of supplying the electrode material onto the support also include a method of supplying the electrode material onto the support by jetting the electrode material from an outlet. In the projecting portion forming step, the electrode material is preferably supplied onto the support by jetting the electrode material from at least two outlets placed side by side in the width direction of the support. By jetting the electrode material from the outlets, for example, the number, position, and interval of the projecting portions to be formed on the support can be easily controlled. Hereinafter, the term "outlet" means a single or a plurality of outlets unless otherwise specified.

The "at least two outlets placed side by side in the width direction of the support" is not limited to the case where all the outlets are linearly placed along the width direction of the support in a plan view, and includes cases where within a range permitted to form at least two projecting portions placed side by side in the width direction of the support, with respect to the position of one outlet as a reference, the position of the other outlet is changed in at least one of the length direction of the support or the thickness direction of the support. For example, as long as two projecting portions placed side by side in the width direction of the support can be formed, a plurality of outlets may be placed so as to be deviated from each other in the length direction of the support or in the thickness direction of the support with reference to the width direction of the support. Specifically, in a plan view, the plurality of outlets may be linearly placed side by side in the width direction of the support, or may be placed in zigzag.

The outlets are preferably placed to be spaced apart from the support.

The number of the outlets is preferably at least 3 (3 or more), more preferably at least 4 (4 or more), even more preferably at least 6 (6 or more), and particularly preferably at least 8 (8 or more). In a case where the number of the outlets is at least 3, the uniformity of a mass distribution of a formed body for an electrode in the width direction can be improved. The upper limit of the number of the outlets is not limited, and may be determined according to, for example, the width of the support, the interval between the outlets, and the jetting amount. The number of the outlets is preferably, for example, 10 or less.

In a case where more than one outlet is provided, the interval between the outlets in the width direction of the support is preferably in a range of 10 mm to 40 mm. In a case where the interval between the outlets is 10 mm or more, a pressure required to level the projecting portions can be reduced, and thus it is possible to prevent contamination in the steps. In a case where the interval between the outlets is 40 mm or less, the uniformity of a mass distribution of a formed body for an electrode in the width direction can be improved. The interval between the outlets in the width direction of the support is measured by the following method. In a case where a straight line that is parallel to the direction orthogonal to the width direction of the support and passes through a central portion of the outlet in a plan view is drawn, the distance between two neighboring straight lines in the width direction of the support is defined as the "interval between the outlets in the width direction of the support".

The interval between the outlets in the width direction of the support is preferably 15 mm or more, and more preferably 20 mm or more from the viewpoint of an improvement in productivity and prevention of contamination in the steps.

The interval between the outlets in the width direction of the support is preferably 35 mm or less, and more preferably 30 mm or less from the viewpoint of an improvement in uniformity of a mass distribution of a formed body for an electrode in the width direction.

In a case where more than one outlet is provided, the average interval between the outlets in the width direction of the support is preferably 10 mm to 40 mm, more preferably 15 mm to 40 mm, and particularly preferably 15 mm to 30 mm from the viewpoint of an improvement in productivity, prevention of contamination in the steps, and uniformity of a mass distribution of a formed body for an electrode in the width direction. The average interval between the outlets in the width direction of the support is calculated by arithmetically averaging the "intervals between the outlets in the width direction of the support" measured by the method described above.

The outlets in the width direction of the support are preferably provided at equal intervals. In a case where the outlets are provided at equal intervals, the uniformity of a mass distribution of a formed body for an electrode in the width direction can be improved. In the present disclosure, the "equal interval" is not limited to the case where the intervals are strictly equal, and includes errors that are allowed in the manufacturing.

The coefficient of variation of the amount of the electrode material jetted from the outlet is preferably 10 or less, more preferably 6 or less, even more preferably 4 or less, and particularly preferably 2 or less. In a case where the coefficient of variation of the amount of the electrode material jetted from the outlet is 10 or less, the uniformity of a mass distribution of a formed body for an electrode in the length direction can be improved. The lower limit of the coefficient of variation of the amount of the electrode material jetted from the outlet is not limited. The coefficient of variation of the amount of the electrode material jetted from the outlet may be determined in a range of, for example, 0.01 or more. The coefficient of variation is calculated by dividing the standard deviation by the average.

In supplying the electrode material onto the support, the electrode material is preferably jetted from the outlet while the outlet and the support are relatively moved. By supplying the electrode material by the above method, the dispersibility of the electrode material can be improved, and thus the uniformity of a mass distribution of a formed body for an electrode can be improved.

In the present disclosure, "relatively moving the outlet and the support" includes moving the outlet with respect to the support, moving the support with respect to the outlet, and respectively moving the outlet and the support. In a case where the outlet and the support are respectively moved, the outlet and the support may be respectively moved in, for example, directions away from each other along the same direction axis. In the projecting portion forming step, the support is preferably moved with respect to the outlet from the viewpoint of an improvement in productivity.

The unit that moves the support is not limited, and known transport units can be used. Examples of the unit that moves the support include a belt conveyor, a linear motion guide, and a cross roller table.

In the method of jetting the electrode material from the outlet, a supply device having an outlet may be used. In a case where a supply device having an outlet is used, the electrode material can be jetted from the outlet of the supply device.

The outlet may be surface-treated. Examples of the surface treatment include silicone coating and fluorine coating. The surface treatment may be a corona treatment.

The outlet preferably has an on-off mechanism controlling the supply of the electrode material from the viewpoint of preventing contamination due to the scattering of the electrode material. Here, the "on-off mechanism" means a movable mechanism capable of opening and closing a flow passage of the electrode material. Examples of the valve body used for the on-off mechanism include a plate-shaped valve body and a spherical valve body.

In a case where the electrode material is supplied using a supply device, the on-off mechanism is also preferably placed in a flow passage of the electrode material from the supply device to the outlet.

From the viewpoint of stability, the supply of the electrode material is preferably 0.01 kg/min to 100 kg/min, more preferably 0.1 kg/min to 10 kg/min, and particularly preferably 0.5 kg/min to 5 kg/min. In a case where more than one outlet is provided, the supply of the electrode material refers to a total amount of the electrode material jetted from all the outlets.

The supply of the electrode material onto the support is preferably 10 mg/cm$^2$ to 1,000 mg/cm$^2$, more preferably 30 mg/cm$^2$ to 700 mg/cm$^2$, and particularly preferably 50 mg/cm$^2$ to 500 mg/cm$^2$ from the viewpoint of battery performance.

In a case where the number of the outlets is at least 3, the amount of the electrode material jetted from the outlets placed on both end sides of the support in the width direction is preferably less than that of the electrode material jetted from an outlet placed at a position other than the both end sides of the support in the width direction. In a case where the amount of the electrode material jetted from the outlets placed on both end sides of the support in the width direction is less than that of the electrode material jetted from the outlet placed at a position other than the both end sides of the support in the width direction, the uniformity of a mass distribution of a formed body for an electrode in the width direction can be improved.

[Projecting Portions]

The projecting portions are placed side by side on the support in the width direction of the support. The projecting portions are formed by the electrode material supplied on the support. The projecting portions can be formed by, for example, controlling the distribution of the electrode material supplied onto the support in the width direction of the support in supplying the electrode material onto the support. In the width direction of the support, the projecting portions are likely to be formed in a region where the supply amount of the electrode material is relatively large. As described above, for example, in a case where the electrode material is jetted from at least two outlets placed side by side in the width direction of the support, the projecting portions can be easily formed. In addition, the projecting portions may be formed by uniformly supplying the electrode material onto the support and then removing the electrode material existing in an optional region in the width direction of the support.

As described above, the cross-sectional shape of the projecting portion may be a shape projecting in an opposite direction to the support (that is, a direction away from the support). Examples of the cross-sectional shape of the projecting portion include a semicircular shape and a trapezoidal shape. However, the cross-sectional shape of the projecting portion is not limited to the above-described shapes.

A maximum height $H_{max}$ of two neighboring projecting portions in the width direction of the support and a height L at a point where the height is minimum between the two projecting portions defining the maximum height $H_{max}$ preferably satisfy a relationship of $0 \leq L/H_{max} < 1$. "$L/H_{max}$" represents a height difference between a projecting portion in two neighboring projecting portions in the width direction of the support and a recessed portion formed between the two projecting portions. In a case where $H_{max}$ and L satisfy the relationship of $0 \leq L/H_{max} < 1$, the uniformity of a mass distribution of a formed body for an electrode in the width direction can be improved. In "$L/H_{max}$", the unit of $H_{max}$ and the unit of L are the same. Examples of the unit include mm (millimeter).

Preferable ranges of the lower limit of "$L/H_{max}$" will be described. $H_{max}$ and L preferably satisfy a relationship of $0 \leq L/H_{max}$, more preferably satisfy a relationship of $0.2 \leq L/H_{max}$, and particularly preferably satisfy a relationship of $0.5 \leq L/H_{max}$.

Preferable ranges of the upper limit of "$L/H_{max}$" will be described. $H_{max}$ and L preferably satisfy a relationship of $L/H_{max} < 1$, more preferably satisfy a relationship of $L/H_{max} < 0.95$, even more preferably satisfy a relationship of $L/H_{max} < 0.9$, and particularly preferably satisfy a relationship of $L/H_{max} < 0.8$.

As shown below, "$H_{max}$" in "$L/H_{max}$" is measured based on a height distribution measured along the width direction of the support. First, the height distribution is measured by irradiating the surface of the support and the surface of the electrode material on the support with laser at intervals of 0.1 mm along the width direction of the support using a laser displacement gauge. Next, in the height distribution, the heights of two neighboring projecting portions are measured. The height of the projecting portion is measured with the surface of the support as a reference surface. That is, in the height distribution, the height of the projecting portion is a distance from the surface of the support to the apex of the projecting portion (that refers to a portion where the height is maximum in the contour line of the target projecting portion in a case where the apex of the projecting portion cannot be clearly specified). In a case where the height of one of the two neighboring projecting portions is denoted by "H1" and the height of the other projecting portion is denoted by "H2", a larger one of "H1" and "H2" is defined as "$H_{max}$".

As shown below, "L" in "$L/H_{max}$" is measured based on a height distribution measured along the width direction of the support. First, in the height distribution obtained by a method equivalent to the above-described method of measuring "$H_{max}$", a point where the height is minimum between the two projecting portions defining "$H_{max}$" is specified. In the height distribution, the point where the height is minimum between the two projecting portions defining "$H_{max}$" is positioned on the contour line connecting the apexes of the two projecting portions defining "$H_{max}$". The point where the height is minimum between the two projecting portions defining "$H_{max}$" is not limited to the surface of the electrode material, and may be the surface of the support. Next, in the height distribution, the height at the point where the height is minimum between the two projecting portions defining "$H_{max}$" is measured, and the obtained value is defined as "L". The height at the point where the height is minimum between the two projecting portions defining "$H_{max}$" is measured with the surface of the support as a reference surface. That is, the height at the point where the height is minimum between the two projecting portions defining "$H_{max}$" is a distance from the surface of the support to the point where the height is minimum between the two projecting portions defining "$H_{max}$". For example, in a case where the point where the height is minimum between the two projecting portions defining "$H_{max}$" is the surface of the support, the value of "$L/H_{max}$" is 0.

Examples of the method of adjusting "$L/H_{max}$" include a method of adjusting the supply of the electrode material and a method of adjusting the interval between the projecting portions.

The maximum height $H_{max}$ of two neighboring projecting portions in the width direction of the support and the distance D between the two projecting portions defining the maximum height $H_{max}$ preferably satisfy a relationship of $1<H_{max}/(D\times0.5)$, more preferably satisfy a relationship of $1.1<H_{max}/(D\times0.5)$, and particularly preferably satisfy a relationship of $1.2<H_{max}/(D\times0.5)$. "$H_{max}/(D\times0.5)$" represents a distribution of the two neighboring projecting portions in the width direction of the support. In a case where $H_{max}$ and D satisfy the relationship of $1<H_{max}/(D\times0.5)$, the uniformity of a mass distribution of a formed body for an electrode in the width direction can be improved. In "$H_{max}/(D\times0.5)$", the unit of $H_{max}$ and the unit of D are the same. Examples of the unit include mm (millimeter).

Preferable ranges of the upper limit of "$H_{max}/(D\times0.5)$" will be described. $H_{max}$ and D preferably satisfy a relationship of $H_{max}/(D\times0.5)<2$, more preferably satisfy a relationship of $H_{max}/(D\times0.5)<1.8$, and particularly preferably satisfy a relationship of $H_{max}/(D\times0.5)<1.7$. In a case where $H_{max}$ and D satisfy the relationship of $H_{max}/(D\times0.5)<2$, it is possible to improve productivity, and it is possible to prevent contamination in the steps.

"$H_{max}$" in "$H_{max}/(D\times0.5)$" is measured by a method equivalent to the method of measuring "$H_{max}$" in "$L/H_{max}$".

As shown below, "D" in "$H_{max}/(D\times0.5)$" is measured based on a height distribution measured along the width direction of the support. First, in the height distribution obtained by a method equivalent to the above-described method of measuring "$H_{max}$", two straight lines that are parallel to the thickness direction of the support and pass through the apexes of the two projecting portions defining "$H_{max}$" (that is, the two neighboring projecting portions in the width direction of the support) are drawn. Next, the distance between the two straight lines is measured, and the obtained value is defined as "D". In the measurement of "D", in a case where the apex of the projecting portion cannot be clearly specified (for example, in a case where the shape of the projecting portion is trapezoid), the apex of the projecting portion is an intermediate point of a portion where the height is maximum in the contour line of the target projecting portion. For example, in a case where the shape of the projecting portion is trapezoid, an intermediate point of an upper side of a pair of parallel sides of the trapezoid facing each other is the apex of the projecting portion.

Examples of the method of adjusting "$H_{max}/(D\times0.5)$" include a method of adjusting the supply of the electrode material and a method of adjusting the interval between the projecting portions.

The number of the projecting portions is preferably at least 3 (3 or more), more preferably at least 4 (4 or more), even more preferably at least 6 (6 or more), and particularly preferably at least 8 (8 or more). In a case where the number of the projecting portions is at least 3, the uniformity of a mass distribution of a formed body for an electrode in the width direction can be improved. The upper limit of the number of the projecting portions is not limited, and may be determined according to, for example, the width of the support and the interval between the projecting portions. The number of the projecting portions is preferably, for example, 10 or less.

The two neighboring projecting portions in the width direction of the support may be in contact with each other or may be separated from each other.

In the projecting portion forming step, the projecting portions are preferably formed at predetermined intervals along the width direction of the support. The distance between two neighboring projecting portions in the width direction of the support is preferably in a range of 10 mm to 40 mm. In a case where the distance between the two neighboring projecting portions in the width direction of the support is 10 mm or more, a pressure required to level the projecting portions can be reduced, and thus it is possible to prevent contamination in the steps. In a case where the distance between the two neighboring projecting portions in the width direction of the support is 40 mm or less, the uniformity of a mass distribution of a formed body for an electrode in the width direction can be improved. The distance between the two neighboring projecting portions in the width direction of the support is measured by a method equivalent to the above-described method of calculating the "distance D between two projecting portions defining the maximum height $H_{max}$".

The distance between the two neighboring projecting portions in the width direction of the support is preferably 15 mm or more, and more preferably 20 mm or more from the viewpoint of an improvement in productivity and prevention of contamination in the steps.

The distance between the two neighboring projecting portions in the width direction of the support is preferably 35 mm or less, and more preferably 30 mm or less from the viewpoint of an improvement in uniformity of a mass distribution of a formed body for an electrode in the width direction.

The average distance between the two neighboring projecting portions in the width direction of the support is preferably 10 mm to 40 mm, more preferably 15 mm to 40 mm, and particularly preferably 15 mm to 30 mm from the viewpoint of an improvement in productivity, prevention of contamination in the steps, and uniformity of a mass distribution of a formed body for an electrode in the width direction. The average distance between the two neighboring projecting portions in the width direction of the support is calculated by arithmetically averaging the "distances between the two neighboring projecting portions in the width direction of the support" measured by the method described above.

In the projecting portion forming step, the projecting portions are preferably formed at equal intervals along the width direction of the support. The distances between the two neighboring projecting portions in the width direction of the support are preferably equal. In a case where the distances between the two neighboring projecting portions in the width direction of the support are equal, the uniformity of a mass distribution of a formed body for an electrode in the width direction can be improved.

In the step of forming the projecting portions, the projecting portions are preferably formed in a strip shape extending in a direction orthogonal to the width direction of the support (that is, the length direction of the support) in a plan view. Here, the term "orthogonal" in the "direction orthogonal to the width direction of the support in a plan view" is not limited to the case where the direction is strictly orthogonal, and includes cases where the direction is substantially orthogonal. "Substantially orthogonal" means that the directions intersect at 90°±3°. In the step of forming the projecting portions, in a case where the projecting portions are formed in a strip shape extending in a direction orthogonal to the width direction of the support in a plan view, the projecting portions can be formed like ridges on the support, and thus the uniformity of the electrode material in the width direction and in the length direction can be improved. Examples of the method of forming the projecting portions in a strip shape include a method of supplying the electrode material onto the support while transporting the support in a direction orthogonal to the width direction of the support. In a case where the electrode material is jetted from the outlet, a method of supplying the electrode material onto the support while relatively moving the outlet and the support is also included.

[Scattering Preventing Member]

In supplying the electrode material onto the support, a scattering preventing member preventing the electrode material from scattering (hereinafter, may be simply referred to as "scattering preventing member") is preferably used. In addition, in jetting the electrode material from the outlet, a scattering preventing member placed between the outlet and the support is preferably used. Using the scattering preventing member, it is possible to prevent contamination in the steps. In the present disclosure, "preventing the electrode material from scattering" means reducing the scattering of the electrode material without departing from the gist of the present disclosure, and is not limited to completely preventing and stopping the scattering of the electrode material.

Examples of the material of the scattering preventing member include resins and metals.

Examples of the metals include stainless steel, copper, and aluminum.

Examples of the resins include a fluororesin, a silicon resin, polypropylene, polyethylene terephthalate, and polyethylene.

The scattering preventing member may be surface-treated. Examples of the surface treatment include silicone coating and fluorine coating. The surface treatment may be a corona treatment.

The shape of the scattering preventing member is not limited. The scattering preventing member preferably extends in the thickness direction of the support from the viewpoint of reducing the shattering of the electrode material. The shape of the scattering preventing member is preferably a frame shape. In a case where the shape of the scattering preventing member is a frame shape, for example, by supplying the electrode material onto the support so as to pass through the frame of the scattering preventing member, the electrode material can be prevented from scattering.

The height of the scattering preventing member is not limited, and may be determined in a range of, for example, 10 mm to 500 mm. The height of the scattering preventing member is preferably in a range of 25 mm to 400 mm, more preferably in a range of 50 mm to 300 mm, and particularly preferably in a range of 100 mm to 200 mm.

The scattering preventing member may be a member capable of temporarily receiving the electrode material in supplying the electrode material onto the support. In supplying the electrode material onto the support, in a case where the electrode material is temporarily received by the scattering preventing member (that is, the electrode material is temporarily received by the scattering preventing member, and then supplied onto the support), the uniformity of the electrode material in the length direction can be improved.

In a case where a movement regulating member to be described later is used in the projecting portion forming step, the scattering preventing member is preferably placed inside the movement regulating member placed on each of both end sides of the support in the width direction.

[Movement Regulating Member]

In the projecting portion forming step, movement regulating members that are placed on both end sides of the support in the width direction and regulate the movement of the electrode material in the width direction of the support (hereinafter, may be simply referred to as "movement regulating member") are preferably used. Using the movement regulating member in the projecting portion forming step, it is possible to prevent the electrode material from scattering, so that it is possible to prevent contamination in the steps. In the present disclosure, "regulating the movement of the electrode material in the width direction of the support" means regulating the movement of the electrode material from the inside to the outside in the width direction of the support with reference to the movement regulating member.

In a case where the movement regulating member is used in the projecting portion forming step, the electrode material is usually supplied onto the support positioned between the movement regulating members placed on both end sides of the support in the width direction.

Examples of the material of the movement regulating member include resins and metals.

Examples of the metals include stainless steel, copper, and aluminum.

Examples of the resins include a fluororesin, a silicon resin, polypropylene, polyethylene terephthalate, and polyethylene.

The movement regulating member may be surface-treated. Examples of the surface treatment include silicone coating and fluorine coating. The surface treatment may be a corona treatment.

The shape of the movement regulating member is not limited. The movement regulating members placed on both end sides of the support in the width direction preferably extend in the length direction of the support. An end portion of the movement regulating member placed at one of both ends in the width direction of the support and an end portion of the movement regulating member placed at the other of the both ends in the width direction of the support may be connected to each other. By connecting the end portion of one movement regulating member and the end portion of the other movement regulating member to each other, for example, a U-shaped movement regulating member or a frame-shaped movement regulating member can be formed in a plan view.

The shape of the movement regulating member is preferably a frame shape. Specifically, in the projecting portion forming step, a frame-shaped movement regulating member that is placed on the support or along the outer circumference of the support and regulates the movement of the electrode material in the width direction of the support and in the direction orthogonal to the width direction of the support is preferably used. In the present disclosure, "regulating the movement of the electrode material in the direction orthogonal to the width direction of the support" means regulating the movement of the electrode material from the inside to the outside in the direction orthogonal to the width direction of the support with reference to the movement regulating member. In a case where the shape of the movement regulating member is a frame shape, it is possible to suppress the movement of the electrode material from the inside to the outside in the frame of the movement regulating member.

The height of the movement regulating member is not limited, and may be determined in a range of, for example, 0.01 mm to 5 mm. The height of the movement regulating member is preferably in a range of 0.01 mm to 2 mm, more preferably in a range of 0.1 mm to 1 mm, and particularly preferably in a range of 0.2 mm to 1.0 mm.

«Leveling Step»

The method of manufacturing a formed body for an electrode according to the present disclosure includes a step of leveling the projecting portions on the support (leveling step). In a case where the method of manufacturing a formed body for an electrode according to the present disclosure includes the leveling step, a formed body for an electrode that is excellent in uniformity of a mass distribution can be manufactured. In the present disclosure, "leveling the projecting portions" means reducing the unevenness of the surface of the electrode material to the extent necessary for improving the uniformity of the mass distribution, and is not limited to completely flattening the surface of the electrode material.

The method of leveling the projecting portions on the support is not limited, and known methods can be used. Examples of the method of leveling the projecting portions include a method using a leveling member. For example, the projecting portions can be leveled by bringing the leveling member into contact with the projecting portions.

Examples of the leveling member include a roll, a press, a scraper, and a plate-shaped member (for example, squeegee). Among the above examples, the leveling member is preferably a roll from the viewpoint of continuity. The leveling member may be surface-treated. Examples of the surface treatment include silicone coating and fluorine coating.

The temperature of the leveling member is not limited. The temperature of the leveling member may be determined in a range of, for example, 10° C. to 50° C. In a case where the leveling member has a temperature adjustment unit, the temperature of the leveling member refers to a set temperature of the leveling member adjusted by the temperature adjustment unit. In a case where the leveling member has no temperature adjustment unit, the temperature of the leveling member refers to a surface temperature of the leveling member.

In the leveling step, the projecting portions and the leveling member may be relatively moved. For example, the projecting portions on the support can be leveled while the projecting portions and the leveling member are relatively moved. In the present disclosure, "relatively moving the projecting portions and the leveling member" includes moving the leveling member with respect to the projecting portions, moving the projecting portions with respect to the leveling member, and respectively moving the projecting portions and the leveling member. In a case where the projecting portions and the leveling member are respectively moved, the projecting portions and the leveling member are preferably respectively moved in directions away from each other along the same direction axis.

In the leveling step, movement regulating members that are placed on both end sides of the support in the width direction and regulate the movement of the electrode material in the width direction of the support are preferably used. Using the movement regulating member in the leveling step, the uniformity of a mass distribution of the electrode material in the width direction of the support can be improved. Examples of the movement regulating member include the movement regulating member described in the above section "Projecting Portion Forming Step", and preferable aspects are also the same.

In the leveling step, a frame-shaped movement regulating member that is placed on the support or along the outer circumference of the support and regulates the movement of the electrode material in the width direction of the support and in the direction orthogonal to the width direction of the support is preferably used. Using the frame-shaped movement regulating member in the leveling step, the uniformity of a mass distribution of the electrode material in the width direction of the support and in the direction orthogonal to the width direction of the support can be improved.

«Pressurizing Step»

The method of manufacturing a formed body for an electrode according to the present disclosure preferably includes a step of pressurizing the electrode material (hereinafter, also referred to as a "pressurizing step"). In a case where the method of manufacturing a formed body for an electrode according to the present disclosure includes the pressurizing step, the uniformity of a mass distribution of a formed body for an electrode can be improved.

The method of manufacturing a formed body for an electrode according to the present disclosure preferably includes the pressurizing step after the leveling step.

The method of pressurizing the electrode material is not limited, and known methods can be used. Examples of the method of pressurizing the electrode material include a method using a pressurizing member.

Examples of the pressurizing member include rolls, belts, and presses.

The pressurizing member may be used alone, or two or more pressurizing members may be used in combination. In the pressurizing step, for example, a pair of rolls may be used, a roll and a belt may be used in combination, or two belts may be used.

In the pressurizing step, the electrode material is preferably pressurized in a stepwise manner using a plurality of rolls. By pressurizing the electrode material in a stepwise manner using a plurality of rolls, the density distribution of the electrode material can be made more uniform, and thus a formed body for an electrode having excellent formability can be obtained. For example, using a plurality of rolls in which a gap between the rolls is adjusted to be narrower in a stepwise manner, the electrode material can be pressurized in a stepwise manner.

The pressure is preferably 1 MPa to 1 GPa, more preferably 5 MPa to 500 MPa, and particularly preferably 10 MPa to 300 MPa.

«Coating Step»

The method of manufacturing a formed body for an electrode according to the present disclosure may include a step of placing another support (hereinafter, referred to as "second support") on the opposite surface to the surface of the electrode material on which the support (referred to as the support described in the above section "Support") is placed (hereinafter, may be referred to as "coating step"). In a case where the method of manufacturing a formed body for an electrode according to the present disclosure includes the coating step, the support described in the above section "Support" is referred to as "first support".

The method of manufacturing a formed body for an electrode according to the present disclosure preferably includes the coating step after the leveling step. In a case where the method of manufacturing a formed body for an electrode according to the present disclosure includes the pressurizing step, the leveling step may be performed before or after the pressurizing step.

Examples of the second support include the support described in the above section "Support".

The shape of the second support is not limited. The shape of the second support is preferably a flat plate shape.

The thickness of the second support is not limited. The average thickness of the second support is preferably 1 µm to 500 more preferably 3 µm to 300 and particularly preferably 5 µm to 200 µm from the viewpoint of self-supporting property, transportability, and penetration resistance. The average thickness of the second support is an arithmetic average of the thicknesses measured at three points by cross-section observation. In the cross-section observation, known microscopes (for example, a scanning electron microscope) can be used.

«Transfer Step»

The method of manufacturing a formed body for an electrode according to the present disclosure may include a step of transferring the electrode material onto another support (second support) (hereinafter, may be referred to as "transfer step") after the leveling step. In the present disclosure, "transferring the electrode material onto another support" means placing the electrode material on another support. In a case where the method of manufacturing a formed body for an electrode according to the present disclosure includes the transfer step, the support described in the above section "Support" is referred to as "first support".

In a case where the method of manufacturing a formed body for an electrode according to the present disclosure includes the pressurizing step, the method of manufacturing a formed body for an electrode according to the present disclosure preferably includes the transfer step after the pressurizing step. In a case where the method of manufacturing a formed body for an electrode according to the present disclosure includes the coating step, the method of manufacturing a formed body for an electrode according to the present disclosure preferably includes the transfer step after the coating step.

In the transfer step, the electrode material can be transferred onto the second support by, for example, bringing the electrode material into contact with the second support while inverting the positional relationship between the first support and the electrode material upside down. In a case where the method of manufacturing a formed body for an electrode according to the present disclosure includes the coating step, for example, the electrode material can be transferred onto the second support by inverting the positional relationship among the first support, the electrode material, and the second support upside down.

Another support (second support) used in the transfer step is synonymous with the second support described in the above section "Coating Step", and preferable aspects are also the same.

Figure 2:
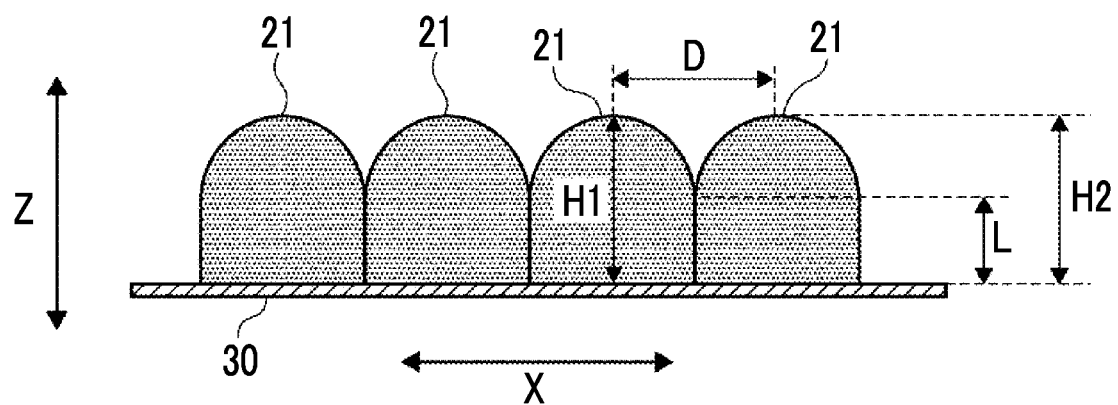
FIG. 2 is a schematic cross-sectional view of a support and projecting portions, taken along the line I-I of FIG. 1.

Next, the method of manufacturing a formed body for an electrode according to the present disclosure will be described with reference to the drawings. FIG. 1 is a schematic diagram showing an example of the method of manufacturing a formed body for an electrode according to the present disclosure. FIG. 2 is a schematic cross-sectional view of the support and the projecting portions, taken along the line I-I of FIG. 1.

In FIG. 1, outlets 10, a scattering preventing member 40, a movement regulating member 50, a movement regulating member 51, and a leveling roll 60 are used as manufacturing equipment.

In FIG. 1, each of the four outlets 10 jets an electrode material 20 and supplies the electrode material 20 onto the support 30. The four outlets 10 are spaced apart from the support 30, and placed side by side in a width direction X of the support 30. The four outlets 10 are connected to four supply devices (not shown), respectively.

The electrode material 20 contains an electrode active material.

The support 30 is transported to the right in a length direction Y of the support 30.

The scattering preventing member 40 can prevent the electrode material 20 from scattering. The scattering preventing member 40 is placed between the outlet 10 and the support 30. The scattering preventing member 40 has four wall portions extending from the support 30 toward the outlet 10 in a thickness direction Z of the support 30. That is, the shape of the scattering preventing member 40 is a frame shape.

The movement regulating member 50 and the movement regulating member 51 can regulate the movement of the electrode material 20 (including scattering of the electrode material 20) in the width direction X of the support 30. The movement regulating member 50 and the movement regulating member 51 are placed on both end sides of the support 30 in the width direction X. An end portion of the movement regulating member 50 and an end portion of the movement regulating member 51 may be connected to each other.

The leveling roll 60 is an example of the leveling member. The leveling roll 60 can level projecting portions 21 by being brought into contact with the projecting portions 21. The leveling roll 60 is provided at a position where it can be brought into contact with the projecting portions 21 in the length direction Y of the support 30.

For example, as shown in FIG. 1, in the projecting portion forming step, the electrode material 20 is supplied onto the support 30 by jetting the electrode material 20 from each of the four outlets 10 while transporting the support 30 to the right in the length direction (Y direction) of the support 30, so that four rows of projecting portions 21 are formed like ridges on the support 30. In a plan view, the projecting portions 21 are formed in a strip shape extending in the length direction (Y direction) of the support 30.

As shown in FIG. 2, the projecting portions 21 are placed side by side in the width direction (X direction) of the support 30 in a cross-sectional view. The projecting portions 21 project in a direction away from the support 30 in the thickness direction (Z direction) of the support 30.

In FIG. 2, H1 and H2 each represent a height of two neighboring projecting portions 21. As described above, by measuring the heights (H1 and H2) of the two neighboring projecting portions, a maximum height $H_{max}$ of the two neighboring projecting portions can be obtained.

In FIG. 2, L represents a height at a point where the height is minimum between the two neighboring projecting portions.

In FIG. 2, D represents a distance between the two neighboring projecting portions.

For example, as shown in FIG. 1, in the leveling step, the projecting portions 21 are leveled by bringing the leveling roll 60 and the projecting portions 21 into contact with each other while transporting the support 30 to the right in the length direction Y of the support.

«Formed Body for Electrode»

A formed body for an electrode obtained by the method of manufacturing a formed body for an electrode according to the present disclosure is a formed product of the electrode material. The formed body for an electrode obtained by the method of manufacturing a formed body for an electrode according to the present disclosure is excellent in uniformity of a mass distribution, and can thus be used as various electrodes. The formed body for an electrode is preferably a formed body for an electrode for an all-solid state secondary battery.

The shape of the formed body for an electrode is not limited, and may be determined, for example, depending on the intended use. The shape of the formed body for an electrode is preferably a flat plate shape.

The average thickness of the formed body for an electrode is preferably 0.01 mm to 2 mm, more preferably 0.05 mm to 1.5 mm, and particularly preferably 0.1 mm to 1 mm from the viewpoint of an improvement in battery performance (for example, discharge capacity and output characteristics). The average thickness of the formed body for an electrode is an arithmetic average of the thicknesses measured at three points by cross-section observation. In the cross-section observation, known microscopes (for example, a scanning electron microscope) can be used.

EXAMPLES

Hereinafter, the present disclosure will be described in detail with examples, but is not limited thereto.

Example 1

[Preparation of Sulfide-Based Inorganic Solid Electrolyte (Li—P—S-based glass)] A sulfide-based inorganic solid electrolyte was prepared with reference to "T. Ohtomo, A. Hayashi, M. Tatsumisago, Y. Tsuchida, S. Hama, K. Kawamoto, Journal of Power Sources, 233, (2013), pp. 231 to 235, and A. Hayashi, S. Hama, H. Morimoto, M. Tatsumisago, T. Minami, Chem. Lett., (2001), pp 872 to 873".

Specifically, in a glove box under an argon atmosphere (dew point: −70° C.), 2.42 g of lithium sulfide ($Li_2S$, manufactured by Sigma-Aldrich Inc., purity: >99.98%) and 3.9 g of diphosphorus pentasulfide ($P_2S_5$, manufactured by Sigma-Aldrich Inc., purity: >99%) were respectively weighed, and then the lithium sulfide and the diphosphorus pentasulfide were mixed for 5 minutes using an agate mortar. The molar ratio of $Li_2S$ to $P_2S_5$ ($Li_2S:P_2S_5$) was 75:25.

66 zirconia beads having a diameter of 5 mm were put in a 45 mL zirconia container (manufactured by Fritsch GmbH). Then, the entire amount of the mixture of the lithium sulfide and the diphosphorus pentasulfide was put therein, and then the container was completely sealed under an argon atmosphere. The container was mounted on a planetary ball mill P-7 (trade name) manufactured by Fritsch GmbH, and mechanical milling was performed for 20 hours at a temperature of 25° C. and a rotation speed of 510 rpm (revolutions per minute) to obtain 6.2 g of a yellow powder of a sulfide-based solid electrolyte (Li—P—S-based glass). The above steps were repeated 50 times, and 300 g of a sulfide-based solid electrolyte was obtained.

[Preparation of Electrode Material (P-1) for Positive Electrode]

180 zirconia beads having a diameter of 5 mm were put in a 45 mL zirconia container (manufactured by Fritsch GmbH), and then 3.0 g of the prepared Li—P—S-based glass was put therein. The container was mounted on a planetary ball mill P-7 manufactured by Fritsch GmbH, and mixing was performed for 2 hours at a temperature of 25° C. and a rotation speed of 300 rpm. Next, 6.8 g of LCO ($LiCoO_2$, manufactured by Nippon Chemical Industrial CO., LTD.) as an active material and Li-100 (0.2 g) manufactured by Denka Company as a conductive auxiliary agent were put in the container. Then, the container was mounted on the planetary ball mill P-7, and mixing was performed for 10 minutes at a temperature of 25° C. and a rotation speed of 100 rpm to obtain a particulate electrode material (P-1) for a positive electrode. The above steps were repeated 50 times, and a required amount of an electrode material (P-1) for a positive electrode was obtained.

[Production of Powder Sheet]

The electrode material (P-1) for a positive electrode was put into two disk feeders (manufactured by Global Materials Engineering Co., Ltd.) placed in parallel at intervals of 40 mm. The electrode material (P-1) for a positive electrode was jetted from an outlet of each disk feeder, and supplied onto a support (aluminum foil, average thickness: 20 μm, width: 100 mm, length: 200 mm). An electrode material of 20 mm in the width direction was supplied from one outlet. One projecting portion was formed per electrode material (P-1) for a positive electrode jetted from one outlet. Next, the electrode material (20 mm in width direction×2) supplied onto the support was leveled using a leveling roll (leveling member). Through the above procedure, a powder sheet having a length of 10 cm or more in a longitudinal direction in which the weight of electrode material per unit area (target value) was 100 mg/cm² was obtained.

Example 2

A powder sheet was produced by the same procedure as in Example 1, except that a regulating frame (movement regulating member) having an inside dimension of 80 mm in a width direction was placed on the support, and then the electrode material (P-1) for a positive electrode was supplied onto the support.

Example 3

A powder sheet was produced by the same procedure as in Example 1, except that a hopper (scattering preventing member, height: 40 mm, width: 80 mm, length: 20 mm) temporarily receiving the electrode material (P-1) for a positive electrode jetted from the outlet was placed between the outlet and the support, and then the electrode material (P-1) for a positive electrode was supplied onto the support via a process of temporarily receiving the electrode material (P-1) for a positive electrode by the hopper.

Example 4

A powder sheet was produced by the same procedure as in Example 1, except that the supply device was changed to a disk feeder (manufactured by Global Materials Engineering Co., Ltd.) in which the coefficient of variation of the amount of the electrode material jetted from the outlet was 2.

Example 5

A powder sheet was produced by the same procedure as in Example 1, except that the type of the supply device was changed to a rotary feeder (manufactured by SANWA GIKEN Co., Ltd.) in which the coefficient of variation of the amount of the electrode material jetted from the outlet was 10.

Example 6

A powder sheet was produced by the same procedure as in Example 1, except that four disk feeders were arranged at intervals of 20 mm.

Example 7

A powder sheet was produced by the same procedure as in Example 1, except that eight disk feeders were arranged at intervals of 10 mm.

Example 8

A powder sheet was produced by the same procedure as in Example 1, except that two disk feeders were shifted in the length direction of the support and placed in zigzag.

Example 9

A powder sheet was produced by the same procedure as in Example 1, except that a surface coating agent (BICOAT (registered trademark) NYF-11, manufactured by Yoshida SKT Co., Ltd.) was applied to a surface in an area from the disk feeder to the outlet, with which the electrode material (P-1) for a positive electrode was brought into contact.

Example 10

A powder sheet was produced by the same procedure as in Example 1, except that an electrode material (P-2) for a positive electrode prepared by kneading the electrode material (P-1) for a positive electrode and an electrolytic solution was used. The content of the electrolytic solution was 30 mass % with respect to the total mass of the electrode material (P-2) for a positive electrode. A lithium hexafluorophosphate solution (1.0 M LiPF$_6$ in EC/EMC=50/50 (v/v)) manufactured by Sigma-Aldrich Inc. was used as the electrolytic solution. "EC" means ethylene carbonate. "EMC" means ethyl methyl carbonate.

Comparative Example 1

A powder sheet was produced by the same procedure as in Example 1, except that as the supply device, one disk feeder (manufactured by Global Materials Engineering Co., Ltd.) in which the width of an outlet was 80 mm was used.

Comparative Example 2

A powder sheet was produced by the same procedure as in Example 1, except that the electrode material (P-1) for a positive electrode supplied onto the support was not leveled.

<Evaluation of Uniformity of Mass Distribution>

Test pieces having a size of 1 cm$^2$ were cut out from 80 places ([8 places in width direction]×[10 places in length direction]) in the powder sheet. A frame-shaped Thomson blade in which the area inside the frame per frame was adjusted to 1 cm$^2$ was used to cut out the test piece. Next, the mass of each of the test pieces cut out from the total 80 places in the powder sheet was measured. From the mass of the test pieces, a mass standard deviation ($\sigma$) in the width direction of the powder sheet, a mass standard deviation ($\sigma$) in the length direction of the powder sheet, and a mass standard deviation ($\sigma$) of the whole powder sheet were obtained, and uniformity of the mass distribution was evaluated according to the following criteria. Of the following criteria, A, B, C, and D were accepted.

(Criteria)

A: $0\% \leq \sigma < 1\%$

B: $1\% \leq \sigma < 2\%$

C: $2\% \leq \sigma < 3\%$

D: $3\% \leq \sigma < 5\%$

E: $5\% \leq \sigma < 10\%$

F: $10\% \leq \sigma$

<Evaluation of Productivity>

In a case where 10 powder sheets were produced, productivity was evaluated according to the following criteria based on an operating rate (r) calculated according to the following expression. In normal operation, it takes 30 seconds to produce one powder sheet. In a case where the operation can be normally performed, 10 powder sheets can be produced in 300 seconds. Therefore, "target production time" in the following expression was 300 seconds. Of the following criteria, A, B, and C were accepted.

[Operating Rate(r)]=[Target Production time]/[Actual Production Time]        Expression:

(Criteria)

A: $0.9 < r \leq 1.0$

B: $0.8 < r \leq 0.9$

C: $0.6 < r \leq 0.8$

D: $0.4 < r \leq 0.6$

E: $r \leq 0.4$

TABLE 1

| | Supply Device | | | | | Equipment | | | |
|---|---|---|---|---|---|---|---|---|---|
| | Number of Supply (number of outlets) | Coefficient of variation | Supply Interval | Placement | Supply Method | Hopper | Leveling Member | Frame | Surface Treatment |
| Example 1 | 2 | 4 | 40 mm | linear | disk feeder | absence | presence | absence | not treated |
| Example 2 | 2 | 4 | 40 mm | linear | disk feeder | absence | presence | presence | not treated |
| Example 3 | 2 | 4 | 40 mm | linear | disk feeder | presence | presence | absence | not treated |
| Example 4 | 2 | 2 | 40 mm | linear | disk feeder | absence | presence | absence | not treated |
| Example 5 | 2 | 10 | 40 mm | linear | rotary feeder | absence | presence | absence | not treated |
| Example 6 | 4 | 4 | 20 mm | linear | disk feeder | absence | presence | absence | not treated |
| Example 7 | 8 | 4 | 10 mm | linear | disk feeder | absence | presence | absence | not treated |
| Example 8 | 2 | 4 | 40 mm | zigzag | disk feeder | absence | presence | absence | not treated |
| Example 9 | 2 | 4 | 40 mm | linear | disk feeder | absence | presence | absence | NYF11 |
| Example 10 | 2 | 4 | 40 mm | linear | disk feeder | absence | presence | absence | not treated |
| Comparative Example 1 | 1 | 4 | — | linear | disk feeder | absence | presence | absence | not treated |
| Comparative Example 2 | 2 | 4 | 40 mm | linear | disk feeder | absence | absence | absence | not treated |

| | Projecting Portion | | | Uniformity | | | Productivity |
|---|---|---|---|---|---|---|---|
| | $L/H_{max}$ | $H_{max}/(D \times 0.5)$ | Interval | Width Direction | Length Direction | Overall | |
| Example 1 | 0.9 | 1.05 | 40 mm | C | C | C | B |
| Example 2 | 0.9 | 1.1 | 40 mm | B | C | B | B |
| Example 3 | 0.9 | 1.05 | 40 mm | C | B | B | B |
| Example 4 | 0.9 | 1.05 | 40 mm | C | B | B | C |
| Example 5 | 0.9 | 1.05 | 40 mm | C | D | C | B |
| Example 6 | 0.94 | 1.2 | 20 mm | A | C | B | B |
| Example 7 | 0.97 | 1.3 | 10 mm | A | C | B | C |
| Example 8 | 0.9 | 1.05 | 40 mm | C | C | C | B |
| Example 9 | 0.9 | 1.05 | 40 mm | C | C | C | A |
| Example 10 | 0.9 | 1.05 | 40 mm | C | C | B | C |
| Comparative Example 1 | 0.6 | 0.7 | — | F | B | D | D |
| Comparative Example 2 | 0.9 | 1.05 | 40 mm | E | E | F | A |

From Table 1, it has been found that Examples 1 to 10 are higher in uniformity of the mass distribution (particularly, uniformity of the mass distribution in the width direction) than Comparative Examples 1 and 2.

The entire disclosure of JP2019-149869 filed on Aug. 19, 2019 is incorporated herein by reference. All literatures, patent applications, and technical standards described herein are incorporated herein by reference to the same extent as if each literature, patent application, or technical standard is specifically and individually indicated as being incorporated by reference.

What is claimed is:

1. A method of manufacturing a formed body for an electrode comprising:
    preparing an electrode material containing an electrode active material;
    forming at least two projecting portions containing the electrode material and placed side by side on a support in a width direction of the support by supplying the electrode material onto the support; and
    leveling the projecting portions on the support,
    wherein a maximum height Hmax, of two neighboring projecting portions in the width direction of the support, and a height L, at a point where a height is minimum between the two projecting portions defining the maximum height Hmax, satisfy a relationship of 0.9<L/Hmax<0.97.

2. The method of manufacturing a formed body for an electrode according to claim 1,
    wherein the maximum height $H_{max}$ and the height L satisfy a relationship of $0.9 < L/H_{max} < 0.95$.

3. The method of manufacturing a formed body for an electrode according to claim 1,
    wherein a maximum height $H_{max}$ of two neighboring projecting portions in the width direction of the support and a distance D between the two projecting portions defining the maximum height $H_{max}$ satisfy a relationship of $1 < H_{max}/(D \times 0.5)$.

4. The method of manufacturing a formed body for an electrode according to claim 1,
    wherein the number of the projecting portions is at least 3.

5. The method of manufacturing a formed body for an electrode according to claim 4,
wherein distances between two neighboring projecting portions in the width direction of the support are equal.

6. The method of manufacturing a formed body for an electrode according to claim 1,
wherein a distance between two neighboring projecting portions in the width direction of the support is in a range of 10 mm to 40 mm.

7. The method of manufacturing a formed body for an electrode according to claim 1,
wherein in the step of forming the projecting portions, the projecting portions are formed in a strip shape extending in a direction orthogonal to the width direction of the support in a plan view.

8. The method of manufacturing a formed body for an electrode according to claim 1,
wherein in the forming the projecting portions, movement regulating members that are placed on both end sides of the support in the width direction and regulate movement of the electrode material in the width direction of the support are used.

9. The method of manufacturing a formed body for an electrode according to claim 1,
wherein in the leveling the projecting portions, movement regulating members that are placed on both end sides of the support in the width direction and regulate movement of the electrode material in the width direction of the support are used.

10. The method of manufacturing a formed body for an electrode according to claim 1,
wherein in the forming the projecting portions, the electrode material is supplied onto the support by jetting the electrode material from at least two outlets placed side by side in the width direction of the support.

11. The method of manufacturing a formed body for an electrode according to claim 10,
wherein the number of the outlets is at least 3.

12. The method of manufacturing a formed body for an electrode according to claim 11,
wherein intervals between the outlets in the width direction of the support are equal.

13. The method of manufacturing a formed body for an electrode according to claim 10,
wherein an interval between the outlets in the width direction of the support is in a range of 10 mm to 40 mm.

14. The method of manufacturing a formed body for an electrode according to claim 10,
wherein a coefficient of variation of an amount of the electrode material jetted from the outlet is 4 or less.

15. The method of manufacturing a formed body for an electrode according to claim 10,
wherein the number of the outlets is at least 3, and an amount of the electrode material jetted from the outlets placed on both end sides of the support in the width direction is less than that of the electrode material jetted from the outlet placed at a position other than the both end sides of the support in the width direction.

16. The method of manufacturing a formed body for an electrode according to claim 10,
wherein in jetting the electrode material from the outlet, a scattering preventing member that is placed between the outlet and the support and prevents scattering of the electrode material is used.

* * * * *